(12) United States Patent
Usui et al.

(10) Patent No.: US 11,010,471 B2
(45) Date of Patent: May 18, 2021

(54) ATTACK CODE DETECTION APPARATUS, ATTACK CODE DETECTION METHOD, AND ATTACK CODE DETECTION PROGRAM

(71) Applicant: NIPPON TELEGRAPH AND TELEPHONE CORPORATION, Tokyo (JP)

(72) Inventors: Toshinori Usui, Tokyo (JP); Makoto Iwamura, Tokyo (JP); Takeshi Yada, Tokyo (JP)

(73) Assignee: NIPPON TELEGRAPH AND TELEPHONE Corporation, Tokyo (JP)

( * ) Notice: Subject to any disclaimer, the term of this patent is extended or adjusted under 35 U.S.C. 154(b) by 22 days.

(21) Appl. No.: 16/338,496

(22) PCT Filed: Oct. 2, 2017

(86) PCT No.: PCT/JP2017/035828
§ 371 (c)(1),
(2) Date: Apr. 1, 2019

(87) PCT Pub. No.: WO2018/066516
PCT Pub. Date: Apr. 12, 2018

(65) Prior Publication Data
US 2019/0384913 A1    Dec. 19, 2019

(30) Foreign Application Priority Data

Oct. 6, 2016 (JP) .............................. JP2016-198409

(51) Int. Cl.
*G06F 21/56* (2013.01)
*G06N 20/00* (2019.01)

(52) U.S. Cl.
CPC ........... *G06F 21/565* (2013.01); *G06N 20/00* (2019.01); *G06F 2221/033* (2013.01)

(58) Field of Classification Search
CPC .. G06F 21/565; G06F 2221/033; G06F 21/54; G06F 21/52; G06F 21/56; G06N 20/00
See application file for complete search history.

(56) References Cited

U.S. PATENT DOCUMENTS 9,189,627 B1 * 11/2015 Islam ..................... G06F 21/562
9,594,912 B1 *  3/2017 Thioux .................. G06F 21/566
(Continued)

OTHER PUBLICATIONS

Extended European Search Report dated Feb. 4, 2020 in European Patent Application No. 17858354.8, 8 pages.
(Continued)

*Primary Examiner* — Meng Li
(74) *Attorney, Agent, or Firm* — Xsensus LLP

(57) ABSTRACT

An attack code detection apparatus includes a preprocessing unit that analyzes in advance a library file for learning used in an ROP (Return Oriented Programming) chain, and obtains sets including the addresses of ROP gadgets, which represent pieces of code in the library file, and increment values of the stack pointer at the time of execution of the ROP gadgets; and a detecting unit that refers to the obtaining result of the preprocessing unit, that verifies, regarding an unknown data series representing the examination target, whether or not the ROP chain is valid in which the ROP gadgets are correctly linked, and that detects whether or not the unknown data series representing the examination target is a malicious data series.

5 Claims, 15 Drawing Sheets

(56) References Cited

U.S. PATENT DOCUMENTS

| | | | |
|---|---|---|---|
| 10,192,052 B1* | 1/2019 | Singh | G06F 21/566 |
| 2014/0075556 A1* | 3/2014 | Wicherski | G06F 21/52 |
| | | | 726/23 |
| 2014/0090061 A1 | 3/2014 | Avasarala et al. | |
| 2014/0344932 A1* | 11/2014 | Polychronakis | G06F 21/54 |
| | | | 726/23 |
| 2016/0034687 A1* | 2/2016 | Rhee | G06F 21/60 |
| | | | 726/23 |
| 2019/0289007 A1* | 9/2019 | Zhang | H04L 63/1416 |
| 2019/0384913 A1* | 12/2019 | Usui | G06F 21/52 |

OTHER PUBLICATIONS

David Pfaff, et al., "Learning How to Prevent Return-Oriented Programming Efficiently," International Conference on Financial Cryptography and Data Security, Mar. 4, 2015, XP047309220, 18 pages.

Andreas Follner, et al., "PSHAPE: Automatically Combining Gadgets for Arbitrary Method Execution;" International Conference on Financial Cryptography and Data Security, Sep. 17, 2016, XP047356320, 17 pages.

Choi et al., "STROP: Static Approach for Detection of Return-Oriented Programming Attack in Network" IEICE Transactions on Communications, vol. E98(1), Jan. 2015, pp. 242-251.

Tanaka et al., "Proposal of a method to detect malicious document file based on ROP attack code detection", 20 pages.

Stancill et al., "Check My Profile: Leveraging Static Analysis for Fast and Accurate Detection of ROP Gadgets", In Proceedings of the 16th International Symposium on Research in Attacks Intrusions and Defenses, Springer, 2013, pp. 62-81.

Jamthagen et al., "eavesROP: Listening for ROP Payloads in Data Streams", In Proceedings of the International Conference on Information Security, Springer, 2014, pp. 413-424.

Usui et al., "Static Detection of ROP Chain Based on Hidden Markov Model", IEICE Technical Report, 29 pages.

Davi et al., "ROPdefender: A Detection Tool to Defend Against Return-Oriented Programming Attacks", Proceedings of the 6th ACM Symposium on Information, Computer and Communications Security, ASIACCS, 2011, 12 pages.

Chipounov et al., "S2E: A Platform for In-Vivo Multi-Path Analysis of Software Systems", In Proceedings of the sixteenth International Conference on Architectural Support for Programming Languages and Operating Systems, ACM, 2011, pp. 265-278.

Chang et al., "Structured learning with constrained conditional models" Machine learning 88.3, 2012, pp. 399-431.

Oishi, "Tamper Resistant Software utilizing Data Memory", IEICE, Sep. 2016, 29 pages.

International Search Report dated Jan. 9, 2018 for PCT/JP2017/035828 filed on Oct. 2, 2017, 6 pages including English Translation.

Communication pursuant to Article 94(3) EPC, dated Aug. 7, 2020, issued in corresponding European Patent Application No. 17858354.8.

* cited by examiner

FIG.3

| BYTE VALUE | LABEL |
|---|---|
| ⋮ | ⋮ |
| 0xff | DOCUMENT |
| 0xd9 | ROP (ADDRESS 1) |
| 0xac | ROP (ADDRESS 2) |
| 0x01 | ROP (ADDRESS 3) |
| 0x01 | ROP (ADDRESS 4) |
| 0xe8 | ROP (ADDRESS 1) |
| 0x11 | ROP (ADDRESS 2) |
| 0x00 | ROP (ADDRESS 3) |
| 0x10 | ROP (ADDRESS 4) |
| 0x52 | ROP (ADDRESS 1) |
| 0xad | ROP (ADDRESS 2) |
| 0x02 | ROP (ADDRESS 3) |
| 0x01 | ROP (ADDRESS 4) |
| 0x00 | ROP (CONSTANT 1) |
| 0x00 | ROP (CONSTANT 2) |
| 0x00 | ROP (CONSTANT 3) |
| 0x00 | ROP (CONSTANT 4) |
| 0x00 | ROP (CONSTANT 1) |
| 0x10 | ROP (CONSTANT 2) |
| 0x00 | ROP (CONSTANT 3) |
| 0x00 | ROP (CONSTANT 4) |

0x0101acd9

Ta

| | |
|---|---|
| 0x00 | ROP (CONSTANT 1) |
| 0x30 | ROP (CONSTANT 2) |
| 0x00 | ROP (CONSTANT 3) |
| 0x00 | ROP (CONSTANT 4) |
| 0x40 | ROP (CONSTANT 1) |
| 0x00 | ROP (CONSTANT 2) |
| 0x00 | ROP (CONSTANT 3) |
| 0x00 | ROP (CONSTANT 4) |
| 0x62 | ROP (JUNK) |
| 0xa1 | ROP (JUNK) |
| 0x8d | ROP (JUNK) |
| 0x37 | ROP (JUNK) |
| 0xd9 | ROP (ADDRESS 1) |
| 0xac | ROP (ADDRESS 2) |
| 0x01 | ROP (ADDRESS 3) |
| 0x01 | ROP (ADDRESS 4) |
| 0x4c | ROP (JUNK) |
| 0x5d | ROP (JUNK) |
| 0x32 | ROP (JUNK) |
| 0x81 | ROP (JUNK) |
| 0x31 | DOCUMENT |
| ⋮ | ⋮ |

0x00003000

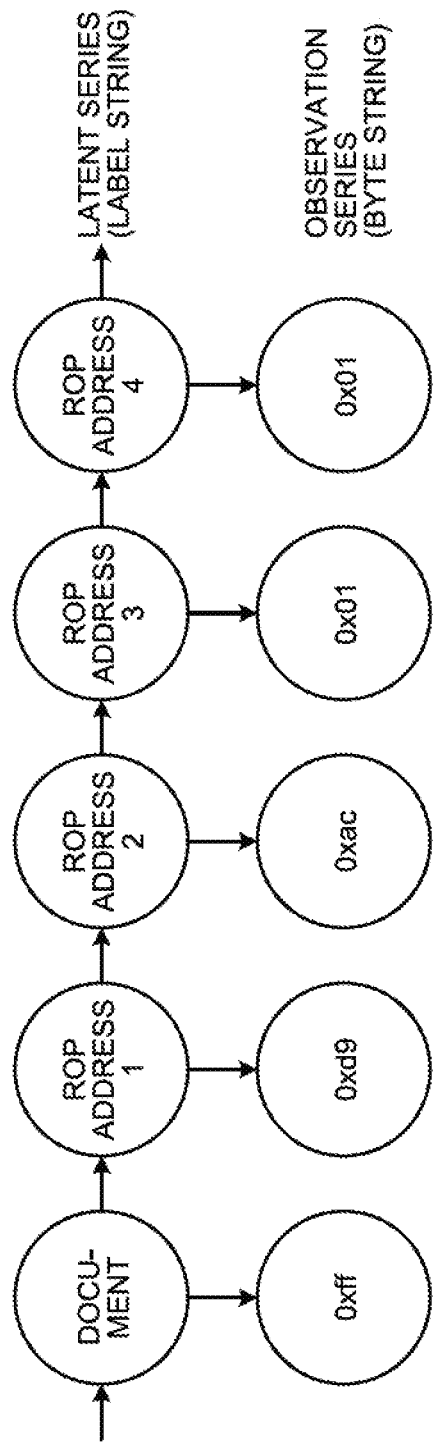

FIG.6

| LABEL<br>(LATENT VARIABLE) | INITIAL STATE PROBABILITY |
|---|---|
| DOCUMENT | $\pi_{DOCUMENT}$ |
| ROP (ADDRESS 1) | $\pi_{ROP(ADDRESS\ 1)}$ |
| ... | ... |
| ROP (JUNK) | $\pi_{ROP(JUNK)}$ |

| LABEL (LATENT VARIABLE) \ BYTE (OBSERVATION VARIABLE) | 0x00 | ... | 0xFF |
|---|---|---|---|
| DOCUMENT | $b_{DOCUMENT,\ 0x00}$ | ... | $b_{DOCUMENT,\ 0xFF}$ |
| ROP (ADDRESS 1) | $b_{ROP(ADDRESS\ 1),\ 0x00}$ | ... | $b_{ROP(ADDRESS\ 1),\ 0xFF}$ |
| ⋮ | ⋮ | ⋮ | ⋮ |

| TRANSITION DESTINATION (LABEL) / TRANSITION SOURCE (LABEL) | ROP (ADDRESS 1) | ROP (ADDRESS 2) | ... | ROP (JUNK) | DOCUMENT |
|---|---|---|---|---|---|
| DOCUMENT | a<sub>DOCUMENT, ROP(ADDRESS 1)</sub> | a<sub>DOCUMENT, ROP(ADDRESS 2)</sub> | ... | a<sub>DOCUMENT, ROP(JUNK)</sub> | a<sub>DOCUMENT, DOCUMENT</sub> |
| ROP (ADDRESS 1) | a<sub>ROP(ADDRESS 1), ROP(ADDRESS 1)</sub> | a<sub>ROP(ADDRESS 1), ROP(ADDRESS 2)</sub> | ... | a<sub>ROP(ADDRESS 1), ROP(JUNK)</sub> | a<sub>ROP(ADDRESS 1), DOCUMENT</sub> |
| ... | ... | ... | ... | ... | ... |
| ROP (JUNK) | a<sub>ROP(JUNK), ROP(ADDRESS 1)</sub> | a<sub>ROP(JUNK), ROP(ADDRESS 2)</sub> | ... | a<sub>ROP(JUNK), ROP(JUNK)</sub> | a<sub>ROP(JUNK), DOCUMENT</sub> |

T3

ATTACK CODE DETECTION APPARATUS, ATTACK CODE DETECTION METHOD, AND ATTACK CODE DETECTION PROGRAM

CROSS-REFERENCE TO RELATED APPLICATIONS

The present application is based on PCT filing PCT/JP2017/035828, filed Oct. 2, 2017 which claims priority to JP 2016-198409 filed Oct. 6, 2016, the entire contents of each are incorporated herein by reference.

FIELD

The present invention relates to an attack code detection apparatus, an attack code detection method, and an attack code detection program.

BACKGROUND

The threat of attacks, including the threat of targeted attacks, that is attributed to exploitation of the vulnerability of software is becoming evident. Such an attack is performed by executing an attack code with respect to the attack target, thereby causing malware infection. An attack performed by exploiting the vulnerability is mainly made up of three types of attack code, namely, an exploit code, a shell code, and an ROP (Return Oriented Programming) chain.

The exploit code represents an attack code that exploits the vulnerability for the purpose of carrying out malicious actions. The exploit code exploits the vulnerability, such as causing memory destruction, and grabs the control of the programs. As a result, the control of the programs gets transferred to the shell code prepared by the attacker.

The shell code is a piece of a machine language code created by the attacker for making the applications perform arbitrary operations according to the created shell code. In order to carry out an attack using the shell code, the shell code needs to be written in the memory and the programs need to be executed after transferring their control to the shell code. However, in recent years, as a result of the prevalence of data execute prevention mechanisms that make writable memory areas inexecutable, it has become difficult to make an attack successful just by using the shell code.

Consequently, a new attack method called the ROP has become a threat. The ROP represents an attack method in which an arbitrary code is executed by capturing the vulnerability and overwriting the call stack so as to take control of the return destination, and by repeating the return instruction so as to execute the existing code, such as libraries, while patching it up. Meanwhile, the pieces of code in the ROP that are present at the return destinations and that are patched up are called ROP gadgets.

Such ROP is implemented according to the following sequence. Firstly, the attacker exploits the vulnerability of buffer overflow, and confirms that the call stack is rewritable. With that, the attacker becomes able to take control of the subsequent return destinations. Then, the attacker generates a code that is to be overwritten on the call stack. At that time, the attacker patches up the existing code, such as libraries, by repetition of return instructions, and generates a code enabling implementation of arbitrary actions. The generated code is called an ROP chain.

Subsequently, the attacker overwrites the call stack using the ROP chain and executes an arbitrary attacker code with respect to the attack target. This is a standard ROP sequence. In such ROP, an arbitrary code can be executed without inserting a shell code.

In the ROP, although an arbitrary code can be executed without being affected by any data execute prevention mechanism, there are restrictions on the length of the ROP chain depending on the environment of the attack target, and oftentimes the attack cannot be carried out freely. Thus, in recent years, a method in which the data execute prevention mechanism is avoided using a short ROP chain and the actual malicious actions are carried out using a shell code is commonly found as the attacking method.

In order to detect an attack carried out by exploiting the vulnerability and to deal with the attack, there is a method for examining whether or not any attack code is included in the data. Examples of the target data for examination include document files and communication streaming.

As far as detection of an attack code is concerned, from among the three types of attack code mentioned above, the exploit code substantially differs in its configuration depending on the vulnerability to be exploited. Hence, it is a known fact that the detection of an attack code is difficult to perform according to an all-inclusive method.

Moreover, there are times when the shell code too is difficult to detect. As an example, when the shell code is in the encoded form and is decoded immediately before the execution, it is difficult to detect the shell code. In that case, since the characteristics of the shell code are disguised by encoding, the detection becomes difficult. On the other hand, an ROP chain has consistency in the configuration and is present in the non-encoded state. Hence, detection of an ROP chain, from among the types of attack code, has become one of the important technologies.

As far as the method for detecting an ROP chain is concerned, it is possible to think of a dynamic approach and a static approach. In the dynamic approach, an environment for verifying an attack is provided, and the execution of the attack is actually monitored for the detection purposes. In the static approach, no attack is carried out, and the detection is performed based on superficial information of the data such as byte values.

Of the two approaches, in the dynamic approach, since the execution of the attack needs to be monitored, it takes time in general. For example, in the case of detecting the ROP chain included in a malicious document file, in the dynamic approach, an environment in which the attack is successful needs to be prepared and the attack needs to be observed by opening the document file using a viewer application. Hence, the disadvantage of the dynamic approach is that it can be implemented only when high speed is not a requirement.

Hence, when the high-speed detection is required, it is desirable to implement the static approach, and a plurality of static approaches has been proposed (for example, refer to Non Patent Literature 1 to Non Patent Literature 5).

CITATION LIST

Patent Literature

Non Patent Literature 1: C. YoungHan et al. "STROP: Static Approach for Detection of Return-Oriented Programming Attack in Network", IEICE Transactions on Communications, 98(1):242-251, 2015

Non Patent Literature 2: Yasuyuki Tanaka, Atsuhiro Goto "Proposal of a method to detect malicious document file based on ROP attack code detection [in Japanese]", IEICE technical report, 114 (117), 39-45

Non Patent Literature 3: Blaine. Stancill, et al. "Check My Profile: Leveraging Static Analysis for Fast and Accurate Detection of ROP Gadgets", In Proceedings of the 16th International Symposium on Research in Attacks, Intrusions, and Defenses, pages 62-81. Springer, 2013

Non Patent Literature 4: Christopher. Jamthagen, et al. "eavesdROP: Listening for ROP Payloads in Data Streams", In Proceedings of the International Conference on Information Security, pages 413-424. Springer, 2014

Non Patent Literature 5: Toshinori Usui, Tomonori Ikuse, Makoto Iwamura, Yada Takeshi "Static detection of ROP chain Based on Hidden Markov Model [in Japanese]", IEICE technical report, 115 (488), 71-76

SUMMARY

Technical Problem

However, in the static approaches mentioned in Non Patent Literature 1 to Non Patent Literature 5, the focus is only on the features of the byte string without taking into account the link among ROP chains. For that reason, in the static approaches mentioned in Non Patent Literature 1 to Non Patent Literature 5, although there is a high degree of ROP-chain-likeness occurring in an incidental manner, the byte string not representing an ROP chain is sometimes over-detected as an ROP chain.

The present invention has been made in view of the issues mentioned above, and it is an object to provide an attack code detection apparatus, an attack code detection method, and an attack code detection program that enable static detection of ROP chains with a high degree of accuracy, with reduced over-detection, and without losing on the speed.

Solution to Problem

An attack code detection apparatus includes: a preprocessing unit that analyzes in advance a library file for learning used in an ROP (Return Oriented Programming) chain, and obtains a set including address of an ROP gadget, which represents a piece of code in the library file, and an increment value of stack pointer at time of execution of the ROP gadget; and a detecting unit that refers to obtaining result of the preprocessing unit, regarding an unknown data series representing examination target, verifies whether or not the ROP chain is valid in which the ROP gadgets are correctly linked, and detects whether or not the unknown data series representing examination target is a malicious data series.

Advantageous Effects of Invention

According to the present invention, it becomes possible to perform static detection of ROP chains with a high degree of accuracy, with reduced over-detection, and without losing on the speed.

BRIEF DESCRIPTION OF DRAWINGS

FIG. 3 is a diagram for explaining an ROP chain portion in the file illustrated in FIG. 2.

FIG. 4 is a diagram in which the bytes and the labels in the first row to the fifth row of the left side portion of a table in FIG. 3 are schematically associated.

FIG. 6 is a diagram illustrating a table in which, for each latent variable (label), the initial state probability of the latent series is associated.

FIG. 7 is a diagram illustrating a table in which, for each latent variable (label), the output probability for observation variables (bytes) is associated.

FIG. 8 is a diagram illustrating a table in which the transition probability among latent variables (labels) is associated for each combination of transitional latent variables.

DESCRIPTION OF EMBODIMENTS

Figure 1:
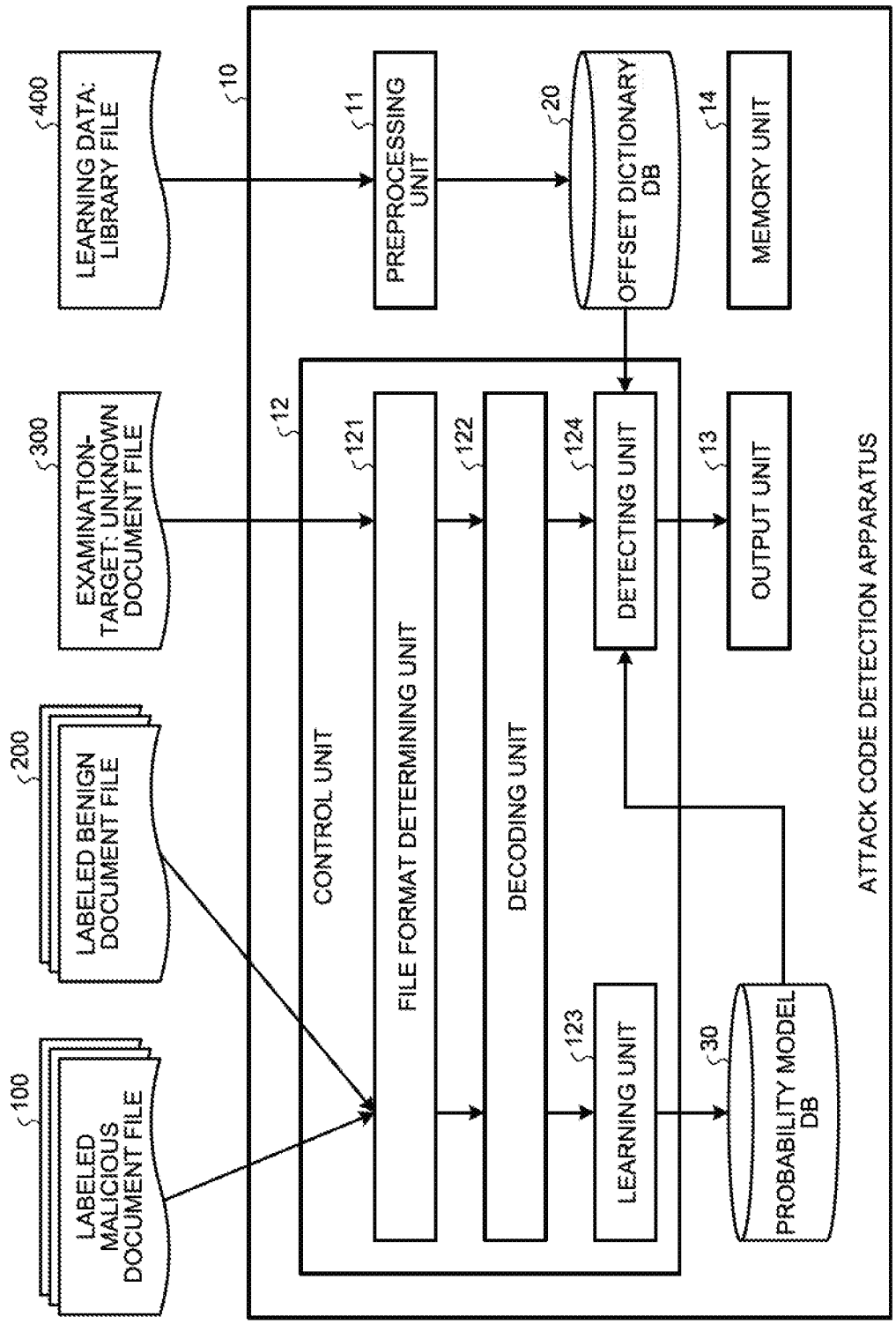
FIG. 1 is a diagram for explaining an exemplary configuration of an attack code detection apparatus according to the embodiment.

An exemplary embodiment of the present embodiment is described below in detail with reference to the accompanying drawings. However, the present invention is not limited by the embodiment described below. Moreover, in the drawings, the same portions are referred to by the same reference numerals.

Embodiment

In an attack code detection apparatus according to an embodiment, a probability model in which the features of malicious document files having an ROP chain are learnt and a probability model in which the features of benign document files are learnt are generated in advance. Moreover, in the attack code detection apparatus, the library files used in an ROP chain are analyzed in advance, and the sets including the addresses of valid ROP gadgets in library files and the incremental values (offsets) of the stack pointer at the time of execution of the ROP gadgets are obtained as an offset dictionary.

Then, in the attack code detection apparatus, based on the generated probability models and the offset dictionary, the likelihood indicating the malicious-document-file-likeness and the likelihood indicating the benign-document-file-likeness is calculated with respect to an unknown document representing the examination target. In the attack code detection apparatus, at the time of calculating the likelihoods, whether or not the ROP gadgets are correctly linked at the time of execution of the ROP chain is taken into account. As a result, in the attack code detection apparatus according to the embodiment, examination of whether or not an unknown document includes an ROP chain is performed in a static manner without opening the unknown document in a viewer application.

[Configuration of Attack Code Detection Apparatus]

Firstly, explained below with reference to FIG. 1 is a configuration of the attack code detection apparatus according to the embodiment. FIG. 1 is a diagram for explaining an exemplary configuration of the attack code detection apparatus according to the embodiment.

As illustrated in FIG. 1, an attack code detection apparatus 10 includes a preprocessing unit 11, a control unit 12, an output unit 13, a memory unit 14, an offset dictionary database (DB) 20, and a probability model DB 30. The attack code detection apparatus 10 receives input of a labeled malicious document file 100, a labeled benign document file 200, an examination-target unknown document file 300, and a learning data library file 400.

The preprocessing unit 11 receives input of the learning data library file 400 that is used in the ROP. Then, the preprocessing unit 11 performs byte-by-byte emulation of the code area of the learning data library file 400 and analyzes the code area in advance. As a result, the preprocessing unit 11 obtains, as an offset dictionary, the sets including the addresses of the ROP gadgets and the offsets of the stack pointer at the time of execution of the ROP gadgets. Then, the preprocessing unit 11 stores the obtained offset dictionary in the offset dictionary DB 20.

The stack pointer gets incremented as a result of executing an ROP gadget. If the incremented destination of the stack pointer also indicates an address, then the ROP gadget corresponding to that address is executed, and then the stack pointer gets incremented further. The increment value of the stack pointer represents the offset. The address of an ROP gadget and the offset of the stack pointer at the time of execution of that ROP gadget correspond to each other. Hence, the preprocessing unit 11 obtains, as an offset dictionary, the sets including the addresses of the ROP gadgets and the offsets of the stack pointer at the time of execution of the ROP gadgets.

The control unit 12 includes an internal memory for storing programs in which various procedures are specified and for storing necessary data, and performs various operations using the programs and the data. For example, the control unit 12 is an electronic circuit such as a CPU (Central Processing Unit) or an MPU (Micro Processing Unit). The control unit 12 includes a file format determining unit 121, a decoding unit 122, a learning unit 123, and a detecting unit 124.

The file format determining unit 121 determines the file formats of all document files that are input. Regarding an input document file, the file format determining unit 121 determines the file format based on the header and the features of the file structure. Examples of the file format include DOC, XLS, PPT, and PDF.

Depending on the format thereof, a document file includes an encoded area. If there is an encoded area in a file, then the decoding unit 122 decodes that area. The decoding unit 122 performs the decoding based on the specifications of the file format, and obtains a byte string having an identical state to the state in which the same document file is expanded in a memory by a viewer application.

The learning unit 123 generates a probability model using the labeled malicious document file 100 (described later) or using the labeled benign document file 200 (described later) as learning data. Then, the learning unit 123 stores the generated probability model in the form of model parameters in the probability model DB 30.

The detecting unit 124 uses the offset dictionary generated by the preprocessing unit 11 and, regarding the examination-target unknown document file 300 (described later), verifies whether or not the ROP chain is valid in which the ROP gadgets are correctly linked, and accordingly detects whether or not the examination-target unknown document file 300 is a malicious document file. Moreover, based on the probability calculation performed using the probability model, the detecting unit 124 detects whether or not the examination-target unknown document file 300 is a malicious document file.

More particularly, by taking into account the possibility that the ROP gadgets are correctly linked, a likelihood ratio test is performed between the probability model of a malicious data series and the probability model of a benign data series, and it is detected whether or not the examination-target unknown document file 300 is a malicious document file. In other words, the detecting unit 124 uses the probability models generated by the learning unit 123 and the offset dictionary generated by the preprocessing unit 11; performs a likelihood ratio test; and calculates whether the benign-document-file-likeness is higher or the malicious-document-file-likeness is higher. At the time of performing the likelihood ratio test, if the candidate portion of the ROP chain is executed, the detecting unit 124 performs the calculation using the offset dictionary and by taking into account the possibility that the ROP gadgets are correctly linked. As a result, the detecting unit 124 achieves reduction in over-detection. If the result of the likelihood ratio test indicates that the malicious-document-file-likeness is higher, then the detecting unit 124 detects that the examination-target unknown document file 300 is a malicious document file including an ROP chain.

The output unit 13 is, for example, a liquid crystal display or a printer that outputs a variety of information, including the information related to the attack code detection. Alternatively, the output unit 13 can be an interface for controlling the input and output of a variety of data, and can output a variety of information to external apparatuss.

The memory unit 14 is implemented using a semiconductor memory apparatus such as a RAM (Random Access Memory) or a flash memory, or using a memory apparatus such as a hard disk or an optical disc; and is used to store processing programs written for operating the attack code detection apparatus 10 and to store the data used during the execution of the processing programs.

The offset dictionary DB 20 is used to store the offset dictionary, which is obtained by the preprocessing unit 11, in the form of combinations of the addresses of the ROP gadgets and the stack pointer at the time of execution of the ROP gadgets. The offset dictionary DB 20 is managed by the attack code detection apparatus 10. Of course, the offset dictionary DB 20 can alternatively be managed by some other apparatus (such as a server). In that case, the preprocessing unit 11 outputs the generated offset dictionary to the management server for the offset dictionary DB 20 via the communication interface of the output unit 13, so that the offset dictionary gets stored in the offset dictionary DB 20.

The probability model DB 30 is used to store the probability models, which are generated by the learning unit 123, in the form of model parameters. The probability model DB 30 is managed by the attack code detection apparatus 10. Of course, the probability models can alternatively be managed by some other apparatus (such as a server). In that case, the learning unit 123 outputs the generated probability models to the management server for the probability model DB 30 via the communication interface of the output unit 13, so that the probability models get stored in the probability model DB 30.

[Configuration of Labeled Malicious Document]

Figure 2:
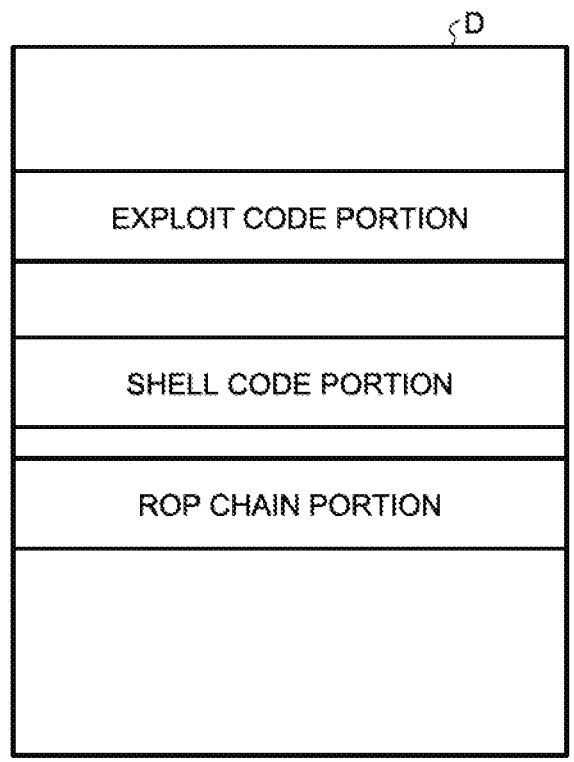
FIG. 2 is a diagram illustrating an example of a labeled malicious document file illustrated in FIG. 1.

Given below is the explanation of the labeled malicious document file 100. FIG. 2 is a diagram illustrating an example of the labeled malicious document file 100. The labeled malicious document file 100 is obtained by researching actual malicious document files; and includes an exploit code portion, a shell code portion, and an ROP chain portion as illustrated in a file D in FIG. 2. In the present embodiment, the focus is on the ROP chain portion.

FIG. 3 is a diagram for explaining the ROP chain portion in the file D (the labeled malicious document file 100) illustrated in FIG. 2. For the purpose of illustration, in FIG. 3 is illustrated a specific example of the data series of the ROP chain portion and the portion preceding and following the ROP chain portion. In FIG. 3, along with illustrating the ROP chain portion, "0xff" is illustrated as the byte value of the portion of the document file positioned immediately before the ROP chain portion, and "0x31" is illustrated as the byte value of the portion of the document file positioned immediately after the ROP chain portion.

Herein, an example is given in which, in the little endian environment, an address or a constant made of four bytes is divided on a byte-by-byte basis, and the data is sequentially recorded starting from the least significant byte first. In that regard, with reference to FIG. 3, the values of the divided bytes are listed in the left-side column of Table Ta in the order of recording. In the following explanation, this column represents the byte string.

In the attack code detection apparatus 10, as the labeled malicious document file 100, each byte value in the labeled malicious document file 100 has a label indicating the origin of that byte associated thereto as illustrated in FIG. 3. Herein, the origin implies whether the corresponding byte value is a constituent element of the document file or a constituent element of the ROP chain. Meanwhile, in FIG. 3, the names of the labels associated to the byte values are listed in the right-side column of Table Ta in a corresponding manner to the respective bytes. In the following explanation, the right-side column is treated as the label string.

An ROP chain has three specific constituent elements, namely, ROP gadget addresses, constants, and junk codes. An ROP gadget address represents the address value indicating the position of an ROP gadget in the memory. A constant represents the constant value used in the arithmetic operations performed in an ROP gadget. A junk code represents a code meant for adjusting the position of the stack pointer and is not referred to at the time of an attack.

In the following explanation, the three constituent elements are written as "address", "constant", and "junk". Moreover, in the present embodiment, the constituent elements of a document file are written as "document labels".

The constituent elements of the ROP chain include ROP (address 1, 2, 3, 4) labels, ROP (constant 1, 2, 3, 4) labels, and ROP (junk) labels. Herein, the number "1", "2", "3", or "4" represents the index for indicating the position of the concerned byte in the address or the constant made of four bytes. Under the little endian environment, the ROP (address 1) label or the ROP (constant 1) label corresponds to the least significant byte of an address or a constant, and the ROP (address 4) label or the ROP (constant 4) label corresponds to the most significant byte of an address or a constant.

For example, regarding an ROP address "0x0101acd9" starting from the second row from the top of the left-side portion of Table Ta illustrated in FIG. 3; the ROP (address 2) label is assigned to the byte value "0xac", the ROP (address 3) label is assigned to the byte value "0x01", and the ROP (address 4) label is assigned to the byte value "0x01". In an identical manner, regarding a constant "0x00003000" starting from the first row from the top of the right-side portion of Table Ta; the ROP (constant 1) label is assigned to the byte value "0x00", the ROP (constant 2) label is assigned to the byte value "0x30", the ROP (constant 3) label is assigned to the byte value "0x00", and the ROP (constant 4) label is assigned to the byte value "0x00".

In this way, in the attack code detection apparatus 10, a document label or an ROP label is associated to each byte of the labeled malicious document file 100, and that data is used as the learning data.

Meanwhile, the design of labels is not limited to the explanation given above. Alternatively, for example, the document labels can be further broken down according to the format of the document file. More particularly, in a file having the DOC format, it is believed that the distribution of the byte string is different in a word document stream including text documents, in a data stream including a variety of data, and in a macro storage including macro programs. Hence, it is possible to think of splitting such streams.

The labeled malicious document file 100 that represents the learning data is created in advance. The labeled malicious document file 100 is created by finding a malicious document file including an ROP chain, and dividing the malicious document file according to a predetermined method. Then, a label is assigned to each byte by performing manual analysis or dynamic analysis.

For example, when the labels are manually assigned, the ROP addresses that are written in a publically-circulated PoC (Proof-of-Concept) code against the vulnerability are referred to, and the ROP chain embedded in the document file is extracted. Then, the types of library used by the ROP are searched from the address values, and the labels are assigned while checking the ROP addresses.

In the case of assigning labels according to dynamic analysis, some other method can also be implemented (for example, refer to L. Davi, A. Sadeghi and M. Winandy, "ROPdefender: A Detection Tool to Defend Against Return-Oriented Programming Attacks", Proceedings of the 6th ACM Symposium on Information, Computer and Communications Security, Pages 40-51, ASIACCS, 2011). That is, the ROP chain portion is extracted using a system in which ROP detection is performed by monitoring the state of run commands and stacks. Moreover, in that system, assignment of labels is performed by adding the function in which the addresses of the executed ROP gadgets are referred to and accordingly the labels are assigned to the extracted ROP chain.

[Configuration of Labeled Benign Document File]

Given below is the explanation of the labeled benign document file 200. The labeled benign document file 200 is a publically-circulated non-malicious document file that does not include any attack code. In an identical manner to the labeled malicious document file 100, the labeled benign document file 200 has a label corresponding to each byte, but does not have an ROP chain. Hence, all labels are document labels.

In an identical manner to the labeled malicious document file 100, the labeled benign document file 200 also represents the learning data and is created in advance. The labeled benign document file 200 is created by finding a benign document file, dividing it according to a predetermined method, and then assigning a document label to each byte. In order to find a benign document file, either it is possible use a tool that is determined to be benign on the basis of some existing security technology, or it is possible to use a research dataset.

[Configuration of Library File for Learning]

The learning data library file 400 that is used in an ROP chain is a library file read into the memory by an application that is targeted in an ROP-based attack. For example, if an attack is carried out using document files, then the application targeted in the attack is a viewer application. Moreover, the learning data library file 400 is disabled for address space layout randomization (hereinafter, the learning data library file 400 is expressed as Non-ASLR). Generally, such a library file is limiting and coverable.

[Probability Model Generation Operation Performed by Learning Unit]

Given below are the operations performed by the learning unit 123. The learning unit 123 uses the labeled malicious document file 100 and the labeled benign document file 200, and generates probability models by learning the structural features of the byte strings in those document files.

Firstly, the explanation is given about generating model parameters with respect to the labeled malicious document file 100. FIG. 4 is a diagram in which the bytes and the labels in the first row to the fifth row of the left side portion of Table Ta in FIG. 3 are schematically associated. As described earlier, in the present embodiment, the learning data is provided in which each byte is associated to a label indicating the origin of that byte. That is, each byte in the document file is assigned to one of the labels from among document labels and a plurality of ROP labels. Hence, it can be said that each byte has a label underlying in the background.

In the ROP representing the target for attack detection, due to the ROP chain, short ROP gadgets are switched in succession, so that the codes are patched up and a code enabling implementation of arbitrary actions is generated. The configuration of an ROP chain is based on the ROP addresses that undergo transition, and the anteroposterior relationship among the ROP addresses is such that the constants appear in continuation if a function is called using ROP addresses and the junk codes appear in continuation if the stack needs to be adjusted. For that reason, it can be said that the label underlying in the background of each byte undergoes transition into some other label.

Hence, as illustrated in FIG. 4, it is possible to think of a model in which, in the background of a byte string representing a series that is observable from the document file, a label string is present that represents a series of latent states undergoing stochastic transition; and in which the byte value is stochastically output for each state. That is, it is possible to think of modeling the ROP chain using a latent variable model. Meanwhile, an observable series (observation series) corresponds to a byte string, and a series of latent states (latent series) corresponds to a label string. Thus, the learning unit 123 generates, as one of the model parameters of the probability model, the output probability for observation variables from the latent series.

Figure 5:
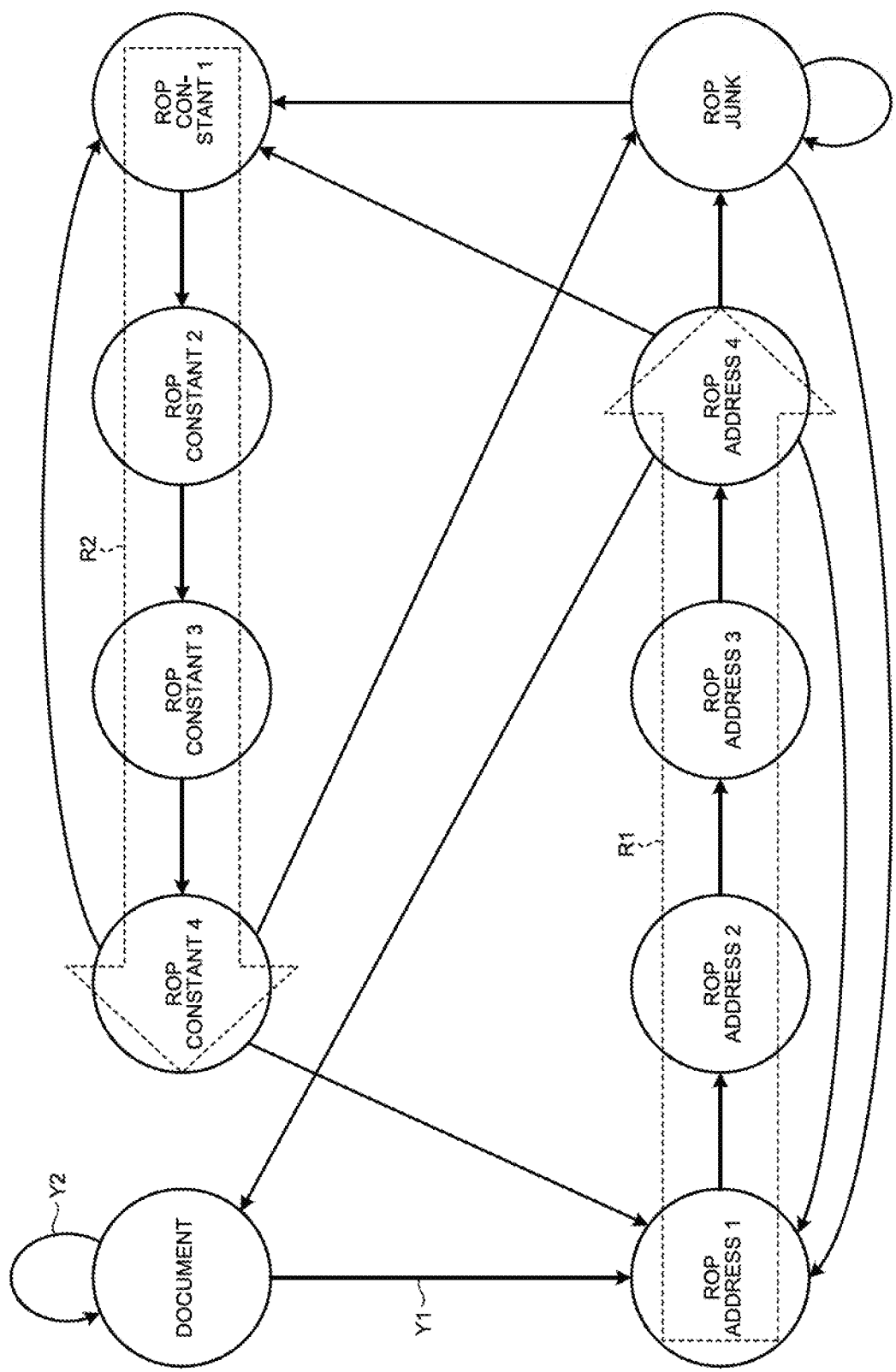
FIG. 5 is a diagram illustrating an example of transition of the labels representing latent variables of a latent series (label string).

Moreover, each label representing a latent variable of the latent series (label string) has the feature of undergoing transition into some other label. FIG. 5 is a diagram illustrating an example of transition of the labels representing the latent variables of the latent series (label string). For example, in the hidden Markov model or in a graphical model such as the conditional probability field that is applicable to the problem of ROP chain detection, the manner in which the latent variables undergo transition represents a critical factor.

Herein, as the feature of transition among the latent variables (labels), as illustrated by arrows R1 and R2 in FIG. 5, the address labels (the ROP address 1 label to the ROP address 4 label) and the constant labels (the constant 1 label to the constant 4 label) are arranged in one way from left to right for four bytes. That is because, in the 32-bit environment, the addresses and the constants are in the units of four bytes.

Moreover, as the feature of transition of the latent variables, document labels undergo transition into only either document labels or address labels (see arrows Y1 and Y2 illustrated in FIG. 5). In the present embodiment, in order to clearly specify the beginning and the end of the ROP chain, the ROP chain is defined to be from the initial ROP address to the last ROP address.

At the time of performing ROP chain detection, in order to detect the presence or absence of an ROP chain based on such features, the learning unit 123 further generates a model that stochastically indicates the transition states of the latent variables, that is, generates the transition probability among latent variables as one of the model parameters of the probability model.

As described above, the learning unit 123 considers a model in which the output probability for observation variables, the transition probability among latent variables, and the initial state probability of the latent series serve as model parameters; and generates a probability model as illustrated in FIGS. 6 to 8. FIG. 6 is a diagram illustrating a table in which, for each latent variable (label), the initial state probability of the latent series is associated. FIG. 7 is a diagram illustrating a table in which, for each latent variable (label), the output probability for observation variables (bytes) is associated. FIG. 8 is a diagram illustrating a table in which the transition probability among latent variables (labels) is associated for each combination of transitional latent variables.

Firstly, the explanation is given about the operations performed by the learning unit 123 for generating the output probability for observation variables that represents one of the model parameters. As described above, the byte string of a document file corresponds to the observation series, and the label string corresponds to the latent series. The learning unit 123 firstly receives the known labeled malicious document file 100 as the learning data (for example, see Table Ta illustrated in FIG. 3).

Subsequently, the learning unit 123 calculates the initial state probability of the latent variables based on the initial label of all labeled document files that have been input. If $s_t$ represents the t-th latent variable of the latent series (label string), then the probability of having a label e as the initial state is obtained by calculating $P(s_1=e)$. With reference to an example in which the initial state is "document", the calculation is performed by dividing "the number of labeled document files having a document label as the initial label" by "the total number of labeled document files". The learning unit 123 performs this calculation for each latent variable. Meanwhile, since it is difficult to think of a document file starting with an ROP chain from the standpoint of the file format, generally the probability of having a document label as the initial state is "1" and the probability of having some other label as the initial state is "0". The learning unit 123 generates, as the model parameter indicating the initial state probability of the latent series, Table T1 (see FIG. 6) in which, as the initial state probability, each latent variable is associated to the probability of being the initial state, that is, the probability of being the initial label; and stores the model parameter in the probability model DB 30.

Subsequently, with respect to each latent variable (label), the learning unit 123 calculates the probability at which the concerned label outputs an observation variable (byte). If $s_t$ represents the t-th latent variable of the latent series (label string) and if $o_t$ represents the t-th observation variable of the observation series (byte string), then the probability at which the label e outputs a byte x can be obtained by calculating $P(o_t=x|s_t=e)$.

Herein, each observation variable can take a byte value from "0x00" to "0xFF". Hence, for example, the probability at which a document label outputs the byte value "0x00" can be calculated by dividing "the number of bytes having the value 0x00 and having a document label assigned thereto" by "the total number of bytes having a document label assigned thereto". The learning unit 123 performs this calculation for each of the byte values "0x00" to "0xFF". As a result, the learning unit 123 can calculate the probability at which a document label outputs each of the byte values "0x00" to "0xFF". The learning unit 123 performs such calculation for all labels.

As a result of performing such calculation, the learning unit 123 generates, as the model parameter indicating the output probability for observation variables, Table T2 in which, for each latent variable (label), the output probability of the corresponding observation variable (byte) is associated; and stores the model parameter in the probability model DB 30.

Regarding the output probability for observation variables, as illustrated in Table T2, for example, a probability "$b_{document, 0x00}$" to a probability "$b_{document, 0x00}$" of outputting the byte values from "0x00" to "0xFF" are associated to the "document" labels, and a probability "$b_{ROP(address\ 1), 0x00}$" to a probability "$b_{ROP(address\ 1), 0xFF}$" of outputting all possible byte values from "0x00" to "0xFF" are associated to the "ROP (address 1)" labels.

Given below is the explanation of the operations performed by the learning unit 123 for generating the transition probability among latent variables that represents one of the model parameters. If $s_t$ represents the t-th latent variable of the latent series (label string), then the transition probability among latent variables from a label $e_i$ to a label $e_j$ can be obtained by calculating $P(s_{t+1}=e_j|s_t=e_i)$.

The learning unit 123 calculates the inter-label transition probability for all possible combinations of the latent variables (labels). Firstly, the learning unit 123 obtains all possible combinations of the labels based on: the feature of the transition among the labels indicating that the address labels and the constant labels are arranged in one way from left to right for four bytes as explained with reference to FIG. 5; the feature of the transition among the labels indicating that document labels undergo transition to only document labels, address labels, or junk labels; and the transition state relationship of the labels as illustrated in FIG. 5.

Regarding all possible combinations of the latent variables (labels), the transition probability among latent variables can be calculated by tallying the number of transitions among the latent variables. For example, the transition probability for the transition from the ROP (address 4) label to the ROP (junk) label can be calculated by dividing "the number of transitions from the ROP (address 4) label to the ROP (junk) label" by "the number of all transitions from the ROP (address 4)". The learning unit 123 performs such calculation for all possible combinations of the latent variables.

As a result of calculating the transition probability among latent variables for all possible combinations of the latent variables, the learning unit 123 generates, as the model parameter indicating the transition probability among latent variables, Table T3 (see FIG. 8) in which the probability of transition is associated for each combination of the latent variables (for each combination of the transition source label and the transition destination label); and stores the model parameter in the probability model DB 30.

Regarding the transition probability among latent variables, if $a_{i,j}$ represents the probability at which the label $e_i$ undergoes transition to the label $e_j$; then, as illustrated in Table T3, the transition probability "$a_{document, ROP(address\ 1)}$" is associated for the transition from the "document" label to the "ROP (address 1)" label. Similarly, as illustrated in Table T3, regarding the transition from the "document" label to each label from the "ROP (address 2)" label to the "document" label, a transition probability is associated from the transition probability "$a_{document, ROP\ (address\ 2)}$" to the transition probability "$a_{document, document}$". Regarding the other labels too, in an identical manner, a transition probability is associated for the transition to each possible transition destination label.

Furthermore, when a library file such as DLL that is used in the configuration of the address portion of the ROP chain is known, the learning unit 123 performs relearning on the basis of the addresses of the ROP gadget candidates. In order for the learning unit 123 to be able to learn the addresses, the premise is to have fixed addresses at the time of loading the library file in the memory. As a result of such relearning, even when the addresses not included in the ROP chain representing the learning data are used as examination targets, the detection rate can be expected to be maintained at a high level.

The relearning can be performed by updating the output probability of the latent variables, which represents one of the model parameters, regarding the ROP (address 1) label to the ROP (address 4) label. Firstly, the learning unit 123 extracts a list of addresses representing the ROP gadget candidates from the file. It is known that the extraction can be performed using existing software.

Then, the learning unit 123 divides, on a byte-by-byte basis, each extracted address representing an ROP gadget candidate; associates a label on a byte-by-byte basis such as associating the ROP (address 1) to the first byte and associating the ROP (address 2) to the second byte; and calculates the output probability. For example, the probability of the ROP (address 1) label outputting the byte value "0x00" can be calculated by dividing "the number of addresses having 0x00 as the first byte" by "the total number of addresses". Regarding each label from the "ROP (address 1)" to the "ROP (address 4)", the learning unit 123 calculates the output probabilities by performing such calculation from the byte value "0x00" to the byte value "0xff"; and updates the model parameter to perform relearning.

Subsequently, in the probability model generated as described above, if the value "0" is present among the transition probabilities or among the output probabilities, then the learning unit 123 performs a smoothing operation. In the smoothing operation, if the dimension of probability "0" is present in the vector of a parameter, that probability is corrected to a value other than "0". That serves as a measure against a problem called zero frequency problem in which, when the occurrence probability of "0" does not appear in the learning data but appears among the recognition targets, the process of multiplication of the probability values results in "0" so that the recognition cannot be performed proficiently. Examples of the smoothing operation include addition smoothing and Kneser-ney smoothing. However, the smoothing operation is not limited to those methods.

Meanwhile, after generating the probability model; if there is a malicious document file that, although not labeled, is known to include an ROP chain, then the learning unit 123 can sometimes perform relearning of the malicious document file and can refine the probability model.

For example, when the hidden Markov model is adapted as the probability model, the learning unit 123 can relearn the model using the Baum-Welch algorithm. Meanwhile, examples of the learning method using the probability model according to the present embodiment include the hidden Markov model and the conditional probability field. However, those are not the only possible methods.

Figure 9:
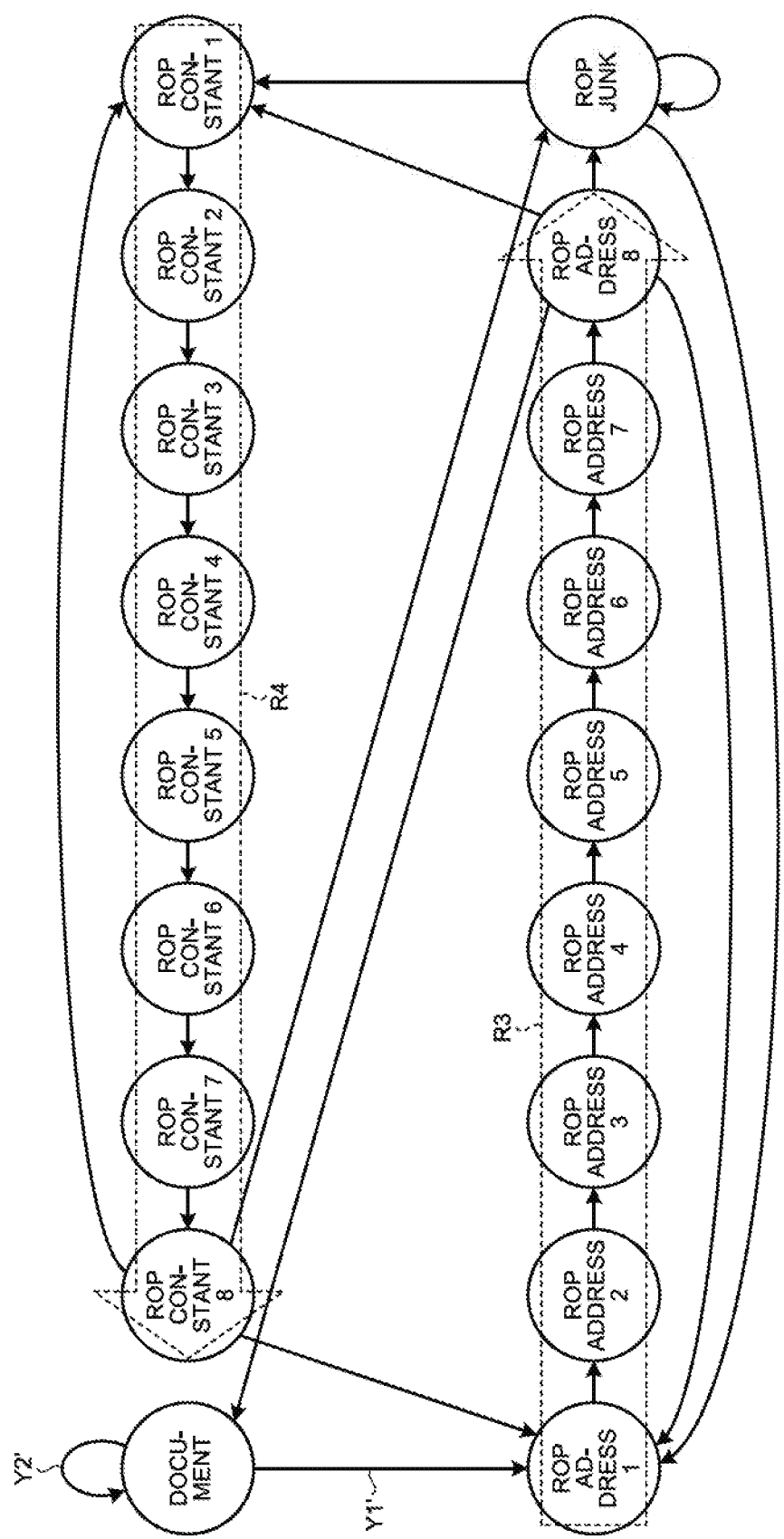
FIG. 9 is a diagram illustrating an example of the transition of labels suitable for the 64-bit environment.

Till now, the explanation is given about the case in which the learning unit 123 generates probability model in the 32-bit environment. Of course, in the 64-bit environment too, the learning unit 123 can generate probability model. FIG. 9 is a diagram illustrating an example of the transition of labels suitable for the 64-bit environment. In the 64-bit environment, since the register width is of eight bytes, the ROP addresses and the constants too are of eight bytes.

Thus, the probability model too is accordingly modified in such a way that there is an increase in the latent variables (labels), and the ROP address portions and the constant portions undergo transition after eight bytes instead of four bytes. More particularly, as illustrated in FIG. 9, of the latent variables, the ROP address labels and the ROP constant labels increase in number to eight. Meanwhile, in the 64-bit environment too, the address labels (the ROP address 1 label to the ROP address 8 label) and the constant labels (the constant 1 label to the constant 8 label) are arranged in one way from left to right for eight bytes (for example, see arrows R3 and R4); and the document labels undergo transition into only either document labels or address labels (see arrows Y1' and Y2' illustrated in FIG. 9).

Of course, the generation of probability model is not limited to the examples of the 32-bit environment and the 64-bit environment described above. That is, in any other environment too, the learning unit 123 can generate a probability model by varying the number of latent variables (labels) of the ROP addresses and the constants and by varying the contiguous number of transitions.

Moreover, also regarding the labeled benign document file 200, the learning unit 123 can generate the model parameters according to the identical sequence to the case of a malicious document file. As far as the specific differences in the resultant models are concerned, since a benign document file holds only document labels, the models are simple models in which the model parameters for the labeled benign document file 200 do not undergo transition into other labels.

As a result of performing the operations described above, the learning unit 123 generates a probability model in which the output probability for observation variables, the transition probability among latent variables, and the initial state probability of the latent series serve as the model parameters.

[Operations performed by preprocessing unit]

Given below are the operations performed by the preprocessing unit 11. The preprocessing unit 11 performs emulation of the code area of the library file used in an ROP chain, and generates an offset dictionary in which the initial addresses of the ROP gadgets in the file are associated to movement values (offset values) indicating the amount of movement of the stack pointer at the time of actual execution of the respective ROP gadgets.

Meanwhile, as described earlier, the learning data library file 400 used in the ROP chain is a library written in the memory by an application targeted in an ROP-based attack, and is expressed as Non-ASLR. Generally, such a library file is limiting and coverable. Hence, in the attack code detection apparatus 10, the learning data library file 400 satisfying the abovementioned conditions is treated as the target for analysis using preprocessing, and is input to the preprocessing unit 11.

More specifically, firstly, the preprocessing unit 11 receives input of the learning data library file 400, and identifies the code area of the learning data library file 400. Then, the preprocessing unit 11 performs emulation with the beginning of the code area serving as the start position. During the emulation, except for the code area of the library, the preprocessing unit 11 can set the values to predetermined initial values. Alternatively, instead of setting initial values, the preprocessing unit 11 can treat the other values as symbols and perform emulation (called symbolic execution) (for example, refer to V. Chipounov, V. Kuznetsov and G. Candea, "S2E: A Platform for In-Vivo Multi-Path Analysis of Software Systems", In Proceedings of the sixteenth International Conference on Architectural Support for Programming Languages and Operating Systems, pages 265-278, CM, 2011).

In the symbolic execution, the variables are treated as symbols during the program execution, and the execution result of the program is evaluated. During the execution, branch conditions involving symbols are not evaluated, and both branches are tracked so that the execution paths of the program are comprehensively executed.

For example, the preprocessing unit 11 uses the symbolic execution and comprehensively collects the ROP gadgets, including the ROP gadgets having branching therein, and the offsets of the stack pointer.

In the symbolic execution, firstly, the preprocessing unit 11 stores the symbols in the registers excluding the instruction pointer. Then, the preprocessing unit 11 performs the symbolic execution. Subsequently, after the end of the symbolic execution performed with the beginning of the code area serving as the start position; if the return instruction is reached, then the preprocessing unit 11 stores the offset of the stack pointer from the initial value. If there is a plurality of offset candidates due to branching, then the preprocessing unit 11 stores the offsets attributed to all paths. At that time, if the return instruction is not reached, then the preprocessing unit 11 does not add the address to the offset dictionary because the address is believed to be improper as an ROP address.

The preprocessing unit 11 performs such symbolic execution while shifting the start position one byte at a time from the beginning of the code area, and generates an offset dictionary in which the address of each valid ROP gadget is stored in combination with the offset of the stack pointer when that ROP gadget is executed. Then, the preprocessing unit 11 stores the offset dictionary in the offset dictionary DB 20.

[Implementation of ROP Chain Integrity]

In the attack code detection apparatus 10, ROP Chain Integrity (RCI) is implemented in order to illustrate the method for utilization of the offset dictionary generated by the preprocessing unit 11.

The RCI is defined as the integrity for guaranteeing correct linking of ROP gadgets. Moreover, the state in which ROP chains are not correctly linked and the RCI has collapsed is defined to have caused Chain Violation (CV). As the premise for the RCI, in order to ensure that the ROP chain is executed as intended by the attacker, the ROP gadgets constituting the ROP chain need to be correctly linked. For that reason, when a gadget indicated by an ROP gadget address in the ROP chain is executed, the ROP gadget address to be executed next needs to be present at the next destination pointed by the stack pointer.

For that reason, the RCI verification can be performed if there is advancement of the stack pointer, and the learning unit 123 can perform static verification using the offset dictionary. Since this verification is performed in a static and determinative manner, it is carried out at a fast rate. Thus, in the attack code detection apparatus 10, the preprocessing unit 11 analyzes the learning data library file 400 in advance and creates an offset dictionary. With that, although the creation of an offset dictionary requires time, the examination including the RCI verification can be performed at a fast rate with fewer overheads.

For example, when an ROP gadget address is found, the detecting unit 124 searches the offset dictionary using that address, and obtains the offset of the corresponding stack pointer. Then, the detecting unit 124 checks whether an ROP gadget address is present at the position to which the stack pointer is advanced by an amount equal to the offset. By repeating this operation, the RCI verification can be performed.

The effects of the RCI verification include reduction of over-detection. Herein, over-detection implies determining an originally benign entity to be malicious. In the conventional static examination; if a byte string having a high degree of ROP-chain-likeness in spite of not being an ROP chain appears by coincidence, then that byte string is sometimes detected as an ROP chain. That becomes the cause of over-detection. However, since a coincidentally-appearing byte string having a high degree of ROP-chain-likeness is not designed to have correct links among the ROP gadgets, it results in CV. Regarding the occurrence of CV, since there is a collapse of the RCI, even with respect to a coincidentally-appearing byte string having a high degree of ROP-chain-likeness, the detecting unit 124 correctly detects that the byte string is not an ROP chain. As a result, in the attack code detection apparatus 10, as a result of performing the RCI verification, such over-detection can be reduced.

In this way, in the attack code detection apparatus 10 according to the embodiment, the detecting unit 124 performs likelihood calculation in consideration of the RCI, and enables highly accurate detection with reduced over-detection.

[Detection Operation of Detecting Unit]

Given below is the detailed explanation of the detection operation performed by the detecting unit 124. The detecting unit 124 uses the probability models generated by the learning unit 123 as well as uses the offset dictionary generated by the preprocessing unit 11, and detects whether the examination-target unknown document file 300 has a high degree of malicious-document-file-likeness including an ROP chain or has a high degree of benign-document-file-likeness. As a result of the detection, if the degree of malicious-document-file-likeness is high, then the detecting unit 124 detects the examination-target unknown document file 300 as a malicious document file including an ROP chain.

Firstly, the detecting unit 124 obtains, from the probability model DB 30, the model parameters of the probability models corresponding to the file format determined by the file format determining unit 121. Herein, $\theta_{Mal}$ is assumed to represent the model parameter of the probability model of a malicious document file including an ROP chain, and $\theta_{Ben}$ is assumed to represent the model parameter of the probability model of a benign document file.

Moreover, the detecting unit 124 obtains, from the offset dictionary DB 20, the offset dictionary corresponding to the library files for examination. Herein, a library file for examination implies examining whether an ROP chain using the library file is not included in the examination-target unknown document file 300. When the library file used in the ROP chain is known, the detecting unit 124 can examine only that library file. On the other hand, when the library file used in the ROP chain is not known, the detecting unit 124 can sequentially examine all possible library files. As described earlier, the library files for examination are limited to Non-ASLR library files written in the memory by an application. Hence, even if all such library files are examined, the calculation period is not significantly long.

Then, using the obtained probability models and the obtained offset dictionary, the detecting unit 124 performs a detection operation for examining the presence of absence of an ROP chain in the examination-target unknown document file 300. Firstly, the detecting unit 124 extracts, as an observation series O, the byte string of the examination-target unknown document file 300. Then, the detecting unit 124 calculates likelihoods $L_{Ben}$ and $L_{Mal}$ of the model parameters $\theta_{Ben}$ and $\theta_{Mal}$, respectively, of the observation series O. Of those likelihoods, the likelihood of a benign document can be expressed as given below in Equation (1).

(Likelihood of benign document)=(Probability of byte string being generated by HMM of benign document)     (1)

More particularly, the likelihood $L_{Ben}$ with respect to the model parameter $\theta_{Ben}$ of the observation series O is calculated using Equation (2) given below.

$$L_{Ben} = P(O|\theta_{Ben}) \quad (2)$$

Herein, i represents the byte value of the ROP (address 1) of the byte string and interpretable as an ROP address. Moreover, when it is assumed that the byte string including the byte value i is an ROP address, j represents the byte value of the ROP (address 1) of the subsequently-linked destination. The byte value j is obtained when the offset dictionary is searched while treating the byte string including the byte value i as the ROP address, and the byte value at the position advanced by the amount equal to the corresponding offset value is checked. Meanwhile, $J_x$ represents the set of combinations of all byte values i and all byte values j included in the observation series O. Moreover, $s_i$ and $s_j$ represent labels corresponding to the byte values i and j, respectively; and A1 represents the label of the ROP (address 1).

This arithmetic operation indicates the plausibility when it is assumed that the observation series O outputs the model parameter $\theta_{Ben}$, and can be calculated at a fast rate using a forward algorithm. Meanwhile, the likelihood of a malicious document can be expressed as given below in Equation (3).

(Likelihood of malicious document)=(Probability of byte string being generated by HMM of malicious document)×(Probability of not causing CV)  (3)

More particularly, the likelihood $L_{Mal}$ with respect to the model parameter $\theta_{Mal}$ of the observation series O is calculated using Equation (4) given below.

$$L_{Mal} = P(O|\theta_{Mal}) \prod_{i,j \in J_x} (1 - P(s_i = A1|O, \theta_{Mal})P(s_j \neq A1|O, \theta_{Mal}))  \quad (4)$$

Herein, $F_{i,j}$ represents the probability variable corresponding to the event in which the byte values i and j do not cause CV. Equation (4) indicates the calculation of the likelihood by taking into account the RCI, and indicates the multiplication of the probability at which the observation series O outputs the model parameter $\theta_{Mal}$ and the probability of the observation series O not causing CV. Meanwhile, $P(O|\theta_{Mal})$ can be calculated at a fast rate using a forward algorithm. Moreover, $P(s_i=A1|O, \theta_{Mal})$ and $P(s_j \neq A1|O, \theta_{Mal})$ can be calculated at a fast rate using a forward-backward algorithm. Thus, the overall likelihood $L_{Mal}$ becomes calculable.

Meanwhile, the calculation formula is led in the following manner. Firstly, the probability at which the observation series O outputs the model parameter $\theta_{Mal}$ and does not cause CV at all can be calculated using Equation (5) given below.

$$P(O, \cap_{i,j \in J_x} F_{i,j}|\theta_{Mal}) = P(O|\theta_{Mal})P(\cap_{i,j \in J_x}F_{i,j}|O,\theta_{Mal})  \quad (5)$$

However, since this is difficult to calculate directly, it is assumed that "the probability at which a particular pair of byte values i and j does not cause CV is independent of the probability at which another pair of byte values i and j does not cause CV". Hence, Equation (5) can be approximated as Equation (6) given below.

$$P(O|\theta_{Mal}) \prod_{i,j \in J_x} P(s_i \neq A1 \text{ or } s_j = A1|O, \theta_{Mal}) =$$

$$P(O|\theta_{Mal}) \prod_{i,j \in J_x} (1 - P(s_i = A1|O, \theta_{Mal})P(s_j \neq A1|O, \theta_{Mal}))  \quad (6)$$

Thus, a likelihood ratio Z can be calculated using Equation (7) given below.

$$Z = \frac{L_{Mal}}{L_{Ben}} = \frac{P(O|\theta_{Mal}) \prod_{i,j \in J_x} (1 - P(s_i = A1|O, \theta_{Mal})P(s_j \neq A1|O, \theta_{Mal}))}{P(O|\theta_{Ben})}  \quad (7)$$

The detecting unit 124 determines the maliciousness or benign-ness as given below in Equation (8). That is, if the likelihood ratio Z is smaller than a threshold value t, then the detecting unit 124 determines that the examination-target unknown document file 300 does not include an ROP chain and is benign. On the other hand, if the likelihood ratio Z is equal to or greater than the threshold value t, then the detecting unit 124 determines that the examination-target unknown document file 300 includes an ROP chain and is malicious.

$$\begin{cases} \text{Benign,} & Z < t \\ \text{Malicious,} & Z \geq t \end{cases}  \quad (8)$$

The threshold value t is decided in advance based on the learning data. Examples of the method for deciding on the threshold value t include a method in which detection is performed with respect to the learning data while varying the threshold value t, and then the threshold value t is decided based on the detection accuracy. More particularly, as the method for deciding on the threshold value t, it is possible to think of a method in which the learning data is examined while varying the threshold value t; an ROC curve between the overlooking rate and over-detection rate is drawn; and the threshold value t having the best balance between the overlooking rate and the over-detection rate is selected using the F-measure. Of course, the method for deciding on the threshold value t is not limited to this method.

If the detecting unit 124 determines that the examination-target unknown document file 300 is benign, that is, if the detecting unit 124 determines that the examination-target unknown document file 300 would not carry out an attack based on the ROP chain, then the control unit 12 enables execution of applications such as the viewer application with respect to the examination-target unknown document file 300. However, if the detecting unit 124 determines that the examination-target unknown document file 300 is malicious, that is, if the detecting unit 124 determines that the examination-target unknown document file 300 would carry out an attack based on the ROP chain, then the control unit 12 disables execution of applications such as the viewer application with respect to the examination-target unknown document file 300.

[Sequence of Operations for Generation of Probability Models]

Figure 10:
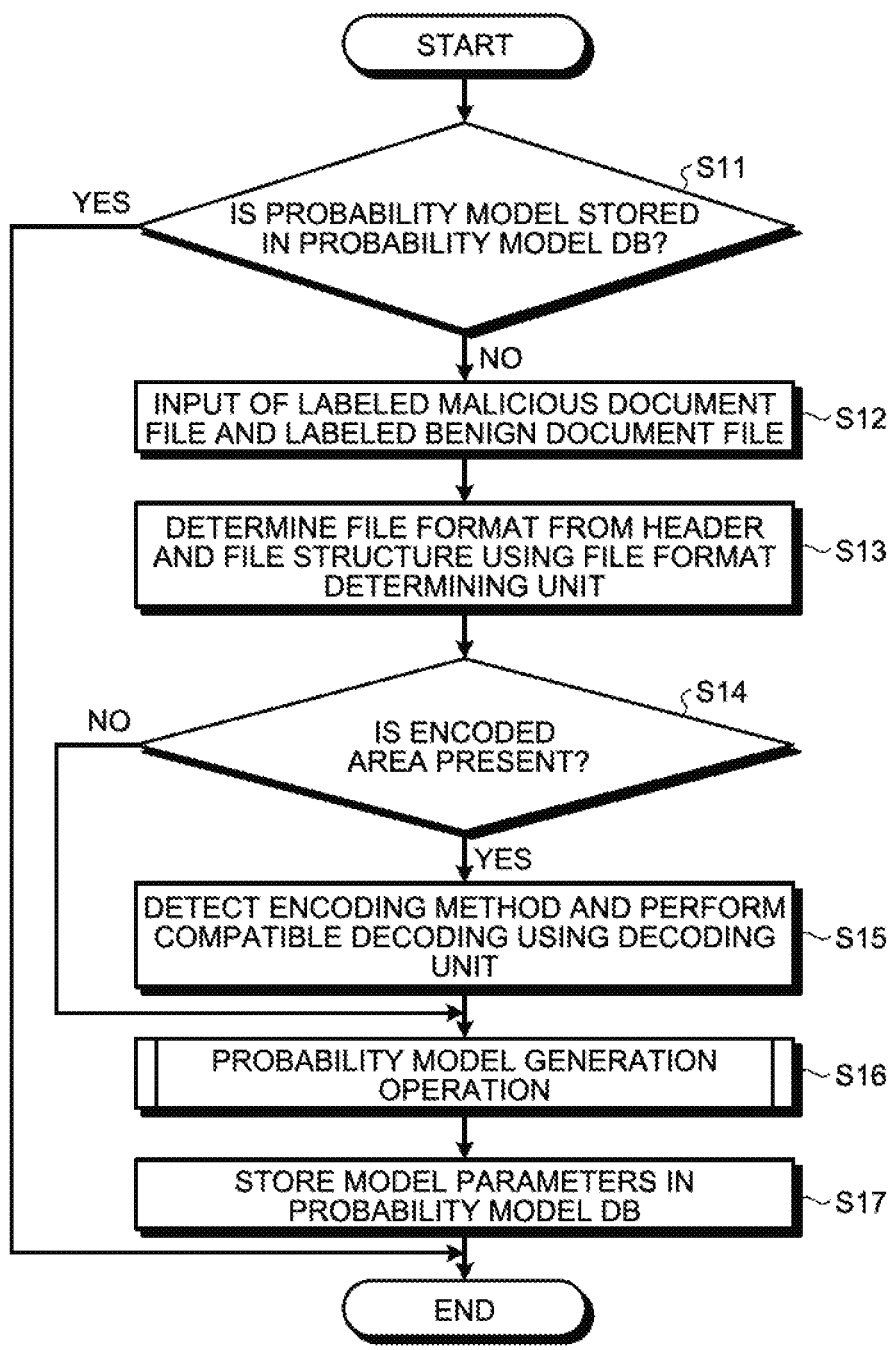
FIG. 10 is a flowchart for explaining a sequence of operations performed by the attack code detection apparatus, which is illustrated in FIG. 1, for generating probability models.

Given below is the sequence of operations performed by the attack code detection apparatus 10 for generating probability models. FIG. 10 is a flowchart for explaining a sequence of operations performed by the attack code detection apparatus 10 for generating probability models.

As illustrated in FIG. 10, firstly, the control unit 12 checks the probability model DB 30, and determines whether or not the model parameters of the probability model corresponding to each file format are stored (Step S11). If it is determined that model parameters of the probability model corresponding to each file format are stored (Yes at Step S11), then the control unit 12 ends the generation of the probability models.

On the other hand, if it is determined that model parameters of the probability model corresponding to each file format are not stored (No at Step S11), then the control unit 12 uses the labeled malicious document file 100 and the labeled benign document file 200 as input data (Step S12) and starts the learning. Herein, the labeled malicious document file 100 and the labeled benign document file 200 are collectively referred to as labeled document files.

Regarding the labeled document files that are input, firstly, the file format determining unit 121 determines the file format from the header and the features of the file structure (Step S13). Herein, examples of the file format include DOC, XLS, PPT, and PDF.

Then, the decoding unit 122 determines whether or not an encoded area is present in the labeled document files that are input (Step S14). If it is determined that an encoded area is present in the labeled document files that are input (Yes at Step S14), then the decoding unit 122 detects the encoding method and implements compatible decoding (Step S15). As far as the detection of the encoding area is concerned, pattern matching of a known encoding method is used.

On the other hand, either if the decoding unit 122 determines that there is no encoded area in the labeled document files that are input (No at Step S14) or after the operation at Step S15 is over, the learning unit 123 performs a probability model generation operation for generating probability models for malicious document files and benign document files corresponding to the file format by referring to the known labeled document files and their file formats (Step S16).

Subsequently, the learning unit 123 stores the generated probability models in the form of model parameters in the probability model DB 30 (Step S17), and ends the operations. Meanwhile, in the present embodiment, although the explanation is given for performing detection of the ROP chain and determination of maliciousness with respect to document files, that is not the only possible case. That is, the same method can be implemented with respect to any arbitrary data series.

[Sequence of Operations During Probability Model Generation Operation]

Figure 11:
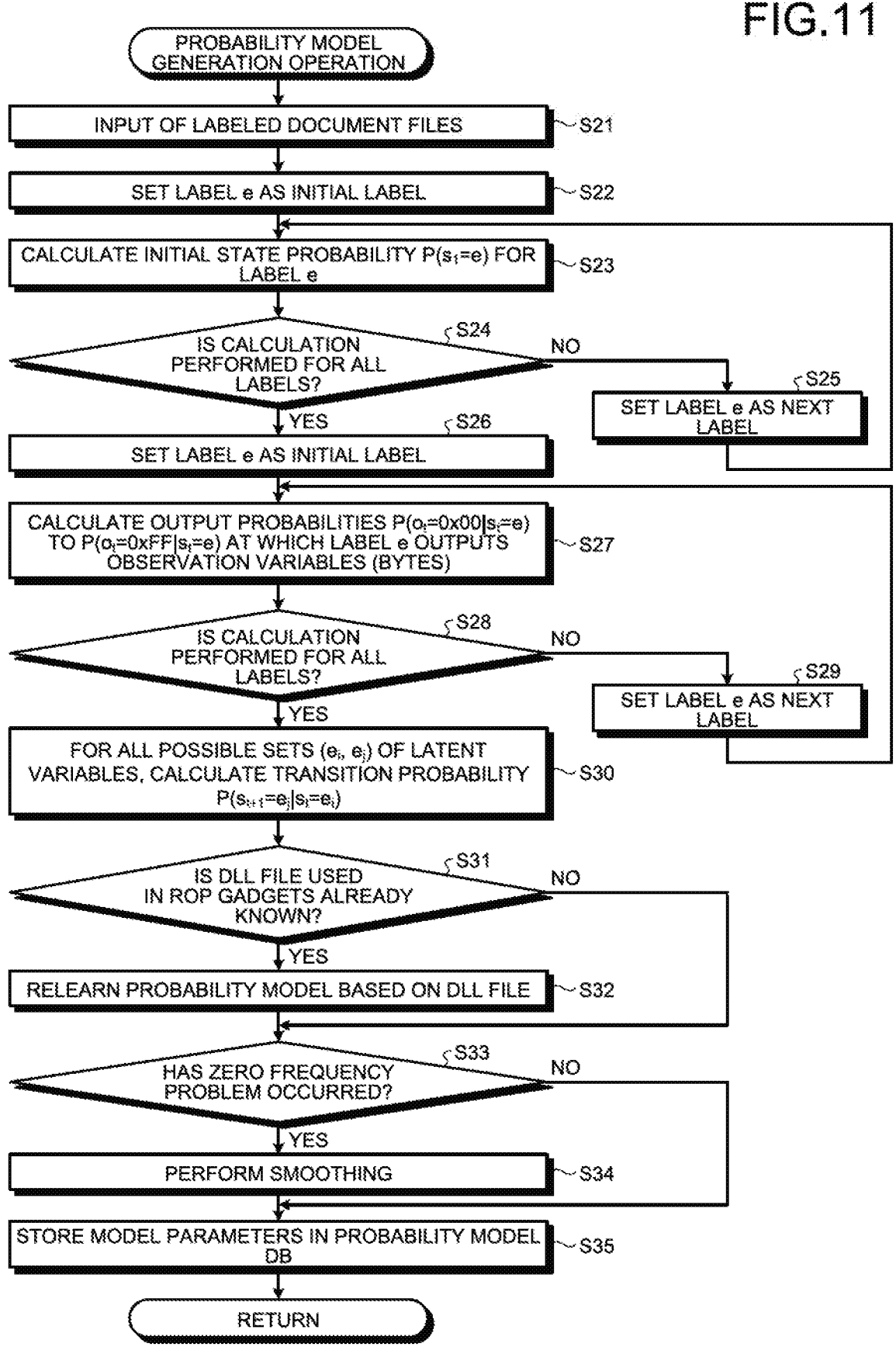
FIG. 11 is a flowchart for explaining a sequence of operations performed during the probability model generation operation illustrated in FIG. 10.

Given below is the explanation of a sequence of operations performed during the probability model generation operation illustrated in FIG. 10. FIG. 11 is a flowchart for explaining a sequence of operations performed during the probability model generation operation illustrated in FIG. 10 (Step S16).

As illustrated in FIG. 11, the learning unit 123 receives input of labeled document files (Step S21); extracts the byte strings and the label strings from the labeled document files; and performs learning using the extracted information.

Firstly, the learning unit 123 sets the label e, which represents the target for arithmetic operations, as the initial label for which the arithmetic operations are to be performed first (Step S22). Then, the learning unit 123 calculates the initial state probability $P(s_1=e)$ for the label e (Step S23). Subsequently, the learning unit 123 determines whether or not the initial state probability $P(s_1=e)$ is calculated for all labels (Step S24). If it is determined that the initial state probability $P(s_1=e)$ is not yet calculated for all labels (No at Step S24), then the learning unit 123 sets the next label as the target label e for calculation (Step S25) and the system control returns to Step S23. Then, the learning unit 123 calculates the initial state probability $P(s_1=e)$ for the concerned label.

When it is determined that the initial state probability $P(s_1=e)$ is calculated for all labels (Yes at Step S24), the learning unit 123 generates Table T1 of the calculated initial state probabilities (see FIG. 6) as the model parameters indicating the initial state probabilities of the concerned latent series.

Subsequently, in order to calculate the probability at which each latent variable (label) outputs observation variables (bytes); firstly, the learning unit 123 sets the label e, which represents the target for arithmetic operations, as the initial label for which the arithmetic operations are to be performed first (Step S26). Then, the learning unit 123 calculates the output probabilities $P(o_t=0x00|s_t=e)$ to $P(o_t=0xFF|s_t=e)$ at which the label e outputs the observation variables (bytes) (Step S27). As described above, for example, if the output probability P represents the probability at which the label e outputs the byte value "0x00", then the learning unit 123 performs the calculation by dividing "the number of bytes having the value "0x00" and having the label e assigned thereto" by "the total number of bytes having a label assigned thereto". Regarding the label e, the learning unit 123 performs the calculation for each byte value from "0x00" to "0xFF", and obtains the probability at which the label e outputs each byte value from "0x00" to "0xFF".

Then, the learning unit 123 determines whether or not the output probabilities $P(o_t=0x00|s_t=e)$ to $P(o_t=0xFF|s_t=e)$ of outputting the observation variables (bytes) are calculated for all labels (Step S28). If it is determined that the output probabilities $P(o_t=0x00|s_t=e)$ to $P(o_t=0xFF|s_t=e)$ of the observation variables (bytes) are not yet calculated for all labels (No at Step S28), then the learning unit 123 sets the next label as the target label e for calculation (Step S29) and the system control returns to Step S27. Then, the learning unit 123 calculates the output probabilities $P(o_t=0x001|s_t=e)$ to $P(o_t=0xFF|s_t=e)$ at which the concerned label outputs the observation variables (bytes).

Meanwhile, if it is determined that the output probabilities $P(o_t=0x00|s_t=e)$ to $P(o_t=0xFF|s_t=e)$ of the observation variables (bytes) are calculated for all labels (Yes at Step S28), then the learning unit 123 can generate Table T2, in which the output probabilities of the observation variables (bytes) of each observation series (byte string) are associated for each latent variable (label) (see FIG. 7), as the model parameters indicating the output probabilities of the observation variables.

Subsequently, for all possible sets $(e_i, e_j)$ of the latent variables (labels), the learning unit 123 calculates the transition probability $P(s_{t+1}=e_j|s_t=e_i)$ among the latent variables $(e_i \rightarrow e_j)$ (Step S30). Herein, $e_i$ represents the transition source label and $e_j$ represents the transition destination label.

The learning unit 123 performs the calculation at Step S30 by tallying the number of transitions among the latent variables as described earlier. For example, the learning unit 123 calculates the transition probability from the ROP (address 4) label to the ROP (junk) label by dividing "the number of transitions from the ROP (address 4) label to the ROP (junk) label" by "the total number of transitions from the ROP (address 4) label". This calculation is performed for all possible sets of the latent variables. As a result of performing such calculation, the learning unit 123 can generate Table T3, in which the probability of transition is associated to each combination of the latent variables (for each combination of a transition source label and a transition destination label) (see FIG. 8), as the model parameters indicating the transition probability among latent variables.

Then, the learning unit 123 determines whether or not a file such as the DLL file used in the configuration of the address portion of the ROP gadgets is already known (Step S31). If the file used in the configuration of the address portion of the ROP gadgets is already known (Yes at Step S31), then the learning unit 123 performs relearning based on the addresses of the ROP gadget candidates in that file (Step S32).

On the other hand, either if the file used in the configuration of the address portion of the ROP gadgets is not known (No at Step S31) or after the operation at Step S32 is over, the learning unit 123 determines whether or not the zero frequency problem has occurred as a result of appearance of the value "0" among the output probabilities (Step S33). If it is determined that the zero frequency problem has occurred (Yes at Step S33), then the learning unit 123 performs a smoothing operation (Step S34).

On the other hand, either if it is determined that the zero frequency problem has not occurred (No at Step S33) or after the smoothing operation at Step S34 is over, the learning unit 123 stores the model parameters of the generated probability model in the probability model DB 30 (Step S35), and ends the probability model generation operation.

As a result of performing the operations explained above, the learning unit 123 generates a probability model that, as the model parameters, includes, for each label representing a latent variable, the output probabilities of the observation variables (bytes) associated to the output probability of each byte representing an observation variable; includes, for each latent variable, the transition probability among latent variables having the transition probabilities to transitionable latent variables associated thereto; and includes the initial state probability of the latent series. The detecting unit 124 (described later) uses the probability model; calculates the likelihood with respect to the byte string of the examination-target unknown document file 300; and detects the presence or absence of the ROP chain in the examination-target unknown document file 300.

[Sequence of Operations for Generation of Offset Dictionary]

Figure 12:
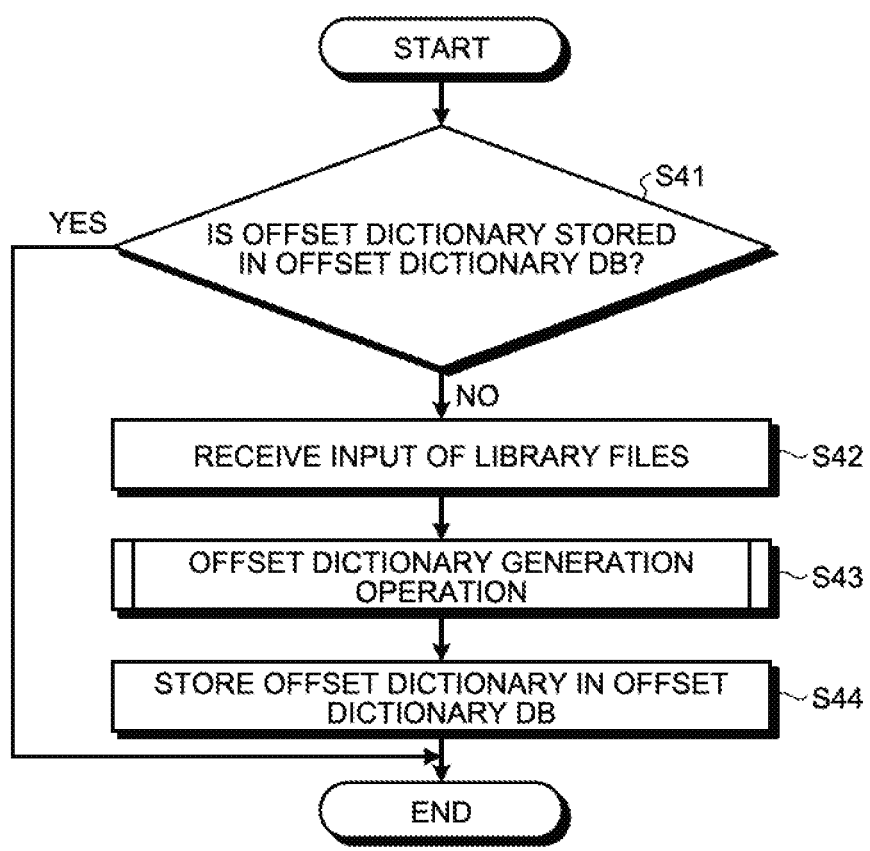
FIG. 12 is a flowchart for explaining a sequence of operations performed in the attack code detection apparatus, which is illustrated in FIG. 1, for generating an offset dictionary.

Explained below with reference to FIG. 12 is a flow of operations performed by the preprocessing unit 11 for generating an offset dictionary. FIG. 12 is a flowchart for explaining a sequence of operations performed in the attack code detection apparatus 10, which is illustrated in FIG. 1, for generating an offset dictionary.

As illustrated in FIG. 12, firstly, the preprocessing unit 11 checks the offset dictionary DB 20 and determines whether or not the offset dictionary corresponding to each library file is stored (Step S41). If it is determined that the offset dictionary corresponding to each library file is stored (Yes at Step S41), then the preprocessing unit 11 ends the generation of the offset dictionary.

On the other hand, if it is determined that the offset dictionary corresponding to each library file is not stored (No at Step S41), then the preprocessing unit 11 receives library files as input data (Step S42). Subsequently, the preprocessing unit 11 performs an offset dictionary generation operation for generating an offset dictionary corresponding to each library file (Step S43).

The preprocessing unit 11 stores the generated offset dictionary in the offset dictionary DB 20 (Step S44) and ends the operations. Herein, although the library files are assumed to have the file format such as DLL or OCX, that is not the only possible case. That is, the same method can be implemented with respect to any arbitrary library file.

[Sequence of Operations During Offset Dictionary Generation Operation]

Figure 13:
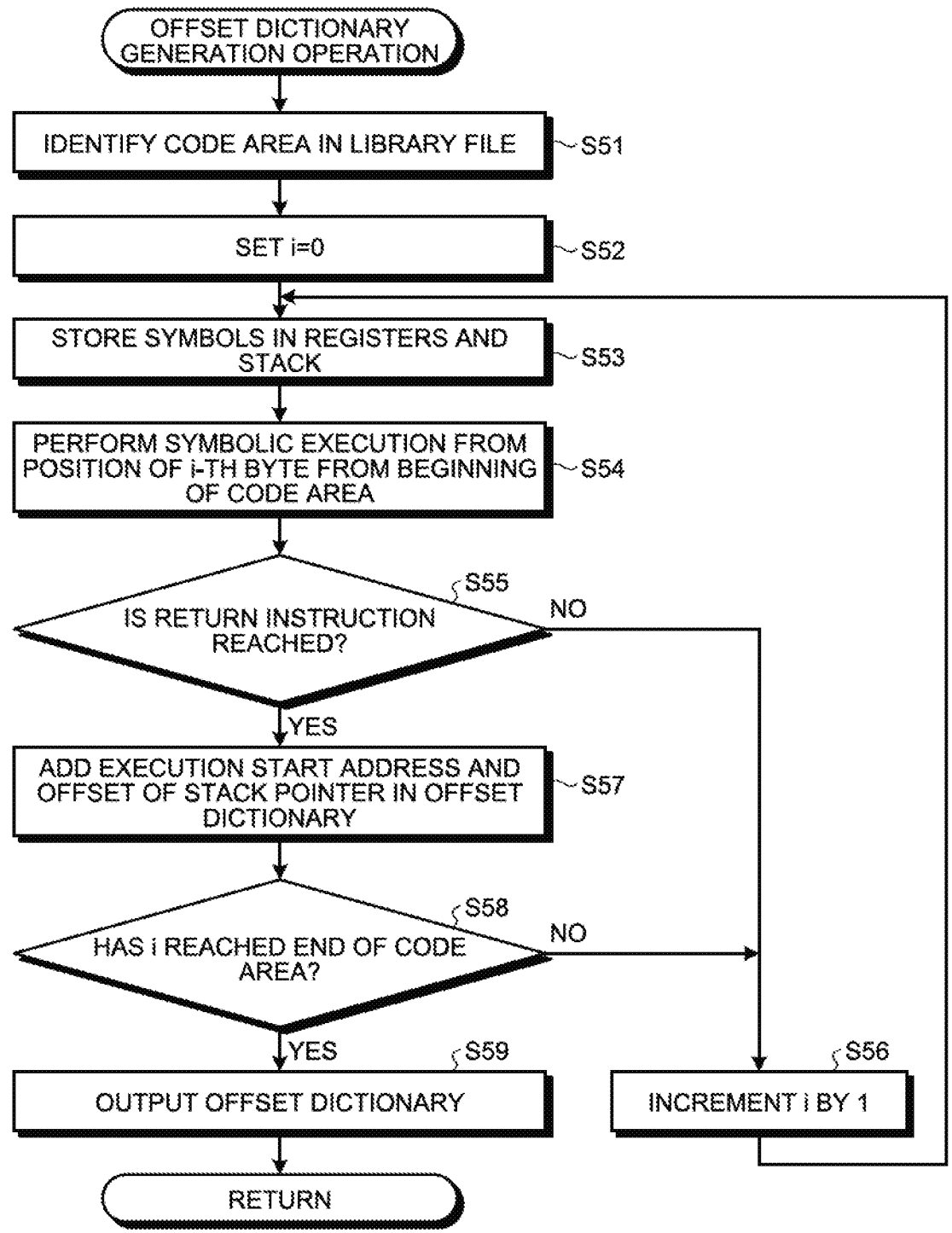
FIG. 13 is a flowchart for explaining a sequence of operations performed during the offset dictionary generation operation illustrated in FIG. 12.

Given below is the explanation of a flow of operations performed during the offset dictionary generation operation illustrated in FIG. 12. FIG. 13 is a flowchart for explaining a sequence of operations performed during the offset dictionary generation operation (Step S43) illustrated in FIG. 12.

As illustrated in FIG. 13, firstly, the preprocessing unit 11 identifies the code area in the input library file (Step S51). Then, the preprocessing unit 11 initializes a variable i to zero (sets i=0) (Step S52). Subsequently, as the preparation for the symbolic execution, the preprocessing unit 11 stores symbols in the registers, excluding the instruction pointer, and in the stack (Step S53). Then, the preprocessing unit 11 performs the symbolic execution from the address of the position of the i-th byte from the beginning of the code area (Step S54).

Herein, the preprocessing unit 11 determines whether or not the return instruction could be reached as a result of execution (Step S55). If it is determined that the return instruction could not be reached as a result of execution (No at Step S55), then the preprocessing unit 11 increments the variable i by one (Step S56), returns to the preparation of the symbolic execution, and repeatedly performs the operations.

On the other hand, if it is determined that the return instruction could be reached as a result of execution (Yes at Step S55), then the preprocessing unit 11 adds the execution start address and the offset of the stack pointer in the offset dictionary (Step S57). The execution start address implies the address of the position of the i-th byte from the beginning of the code area, and can be considered as an ROP address.

Subsequently, the preprocessing unit 11 determines whether or not the variable i has reached the end of the code area (Step S58). If it is determined that the variable i has not reached the end of the code area (No at Step S58), then the preprocessing unit 11 increments the variable i by one (Step S56), returns to the preparation of the symbolic execution, and repeatedly performs the operations. On the other hand, if it is determined that the variable i has reached the end of the code area (Yes at Step S58), then the preprocessing unit 11 outputs the offset dictionary (Step S59) and ends the offset dictionary generation operation.

[Sequence of Operations for Determination of Examination-Target Unknown Document File]

Figure 14:
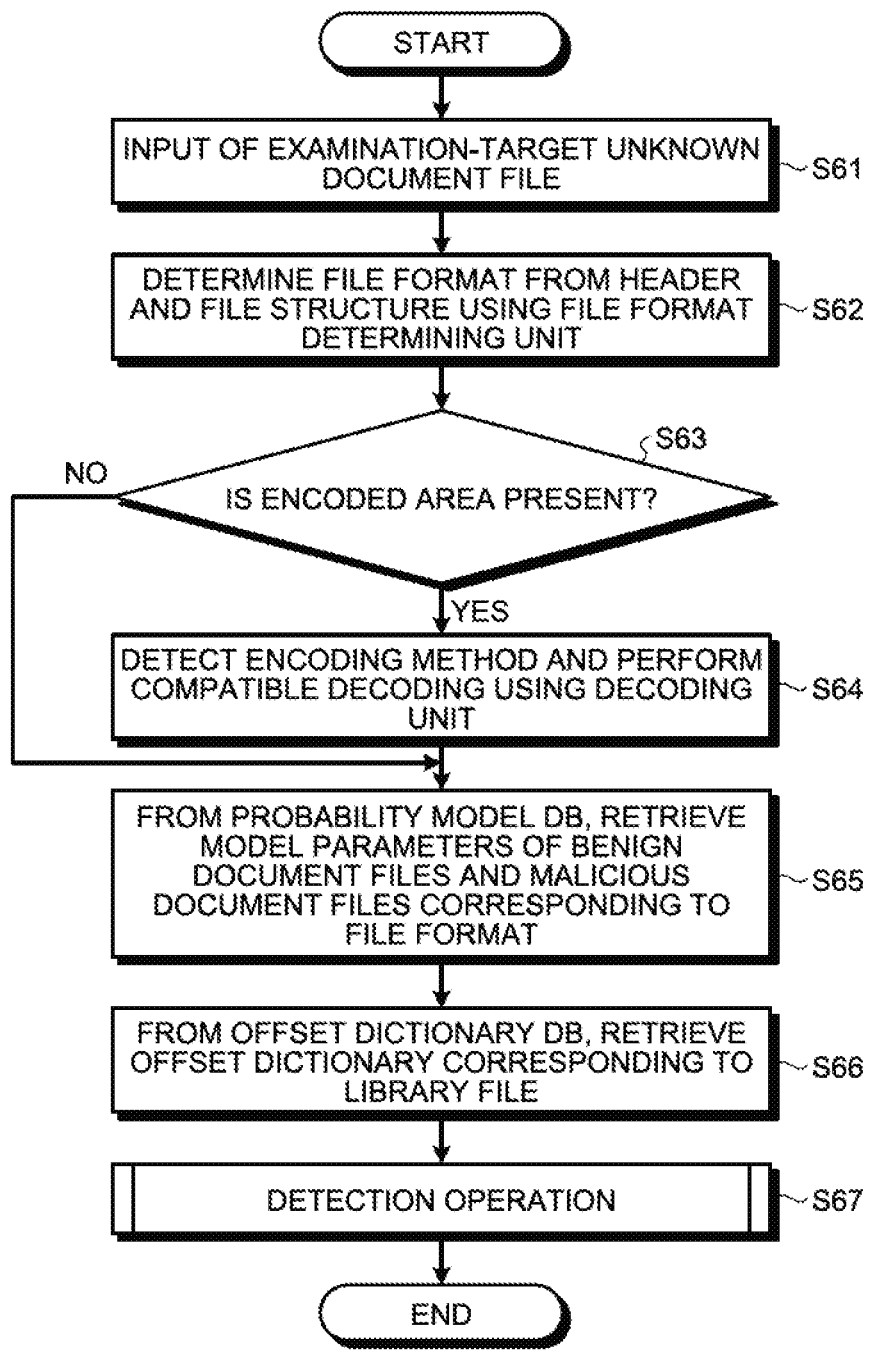
FIG. 14 is a flowchart for explaining a sequence of operations performed in the attack code detection apparatus, which is illustrated in FIG. 1, for determining whether or not an examination-target unknown document file is a malicious document file having an ROP chain.

Given below is the explanation of the determination performed in the attack code detection apparatus 10 with respect to the examination-target unknown document file 300. FIG. 14 is a flowchart for explaining a sequence of operations performed in the attack code detection apparatus 10, which is illustrated in FIG. 1, for determining whether or not the examination-target unknown document file 300 is a malicious document file having an ROP chain.

As illustrated in FIG. 14, in the attack code detection apparatus 10, the examination-target unknown document file 300 is obtained as input data (Step S61). Then, in the attack code detection apparatus 10, the file format determining unit 121 determines the file format (Step S62) in an identical manner to the sequence of operations illustrated in FIG. 10, and the decoding unit 122 determines whether or not an encoded area is present in the examination-target unknown document file 300 (Step S63).

If it is determined that an encoded area is present in the examination-target unknown document file 300 (Yes at Step S63), then the decoding unit 122 detects the encoding method and implements compatible decoding (Step S64).

On the other hand, either if the decoding unit 122 determines that no encoded area is present in the examination-target unknown document file 300 (No at Step S63) or after the operation at Step S64 is over; the detecting unit 124 retrieves, from the probability model DB 30, the model parameters of the probability models of the benign document files and the malicious document files corresponding to the file format of the examination-target unknown document file 300 (Step S65). Moreover, the detecting unit 124 retrieves, from the offset dictionary DB 20, the offset dictionary corresponding to the library file for examination (Step S66).

The library file for examination implies examining whether an ROP chain using the library file is not included in the examination-target unknown document file 300. When the library file used in the ROP chain is known, the detecting unit 124 can examine only that library file. On the other hand, when the library file used in the ROP chain is not known, the detecting unit 124 can sequentially examine all possible library files. As described earlier, the library files for examination are limited to Non-ASLR library files written in the memory by an application. Hence, even if all such library files are examined, the calculation period is not significantly long.

Subsequently, the detecting unit 124 uses the probability models and the offset dictionary, and performs a detection operation for examining the presence or absence of the ROP chain in the examination-target unknown document file 300 (Step S67). As a result of examining about the ROP chain in the detecting unit 124, if it is determined that the examination-target unknown document file 300 would not perform an attack based on the ROP chain, then the control unit 12 enables execution of applications such as the viewer application with respect to the examination-target unknown document file 300.

[Sequence of Operations During Detection Operation]

Figure 15:
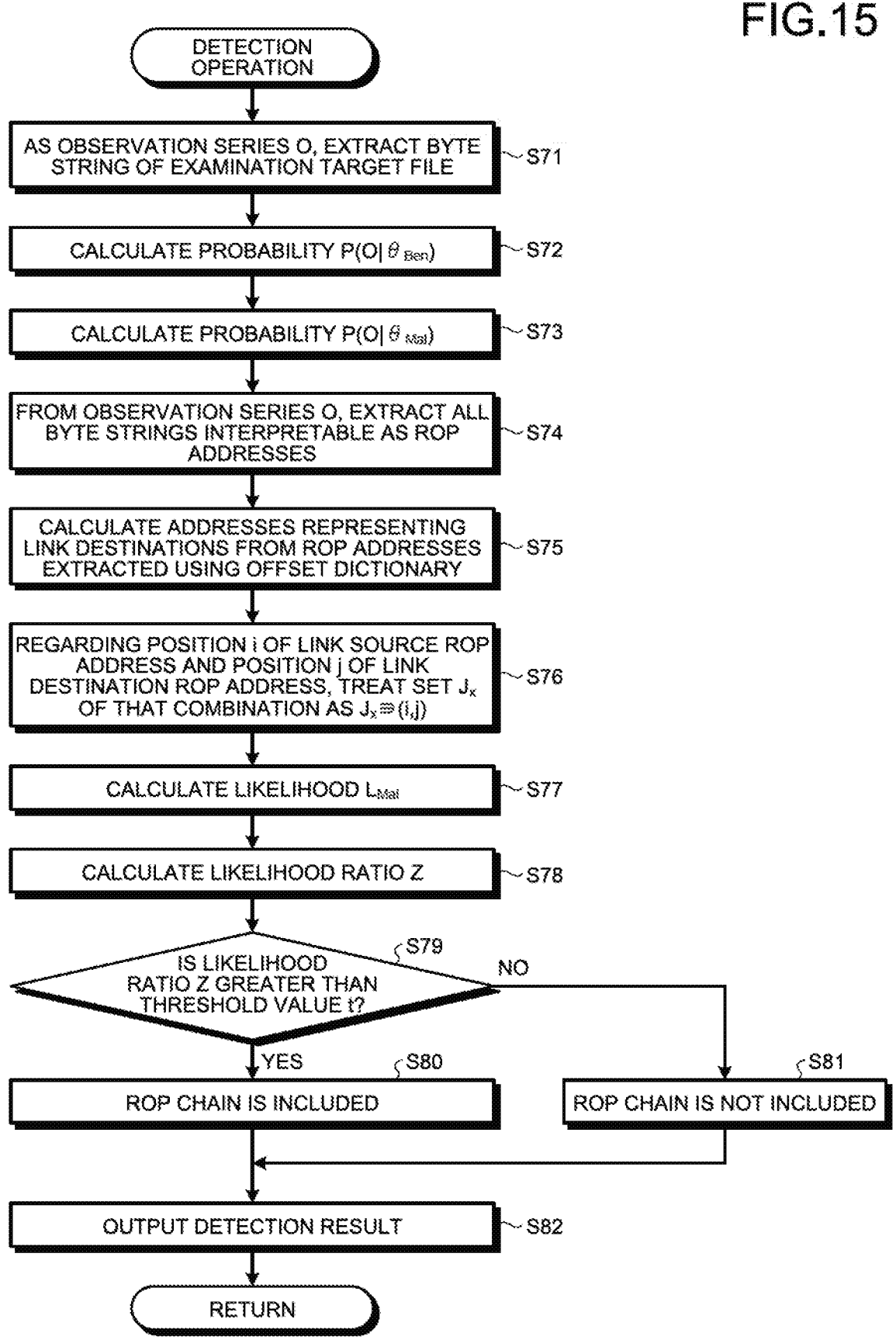
FIG. 15 is a flowchart for explaining a sequence of operations performed during the detection operation illustrated in FIG. 14.

Given below is the explanation of a flow of operations performed during the detection operation illustrated in FIG. 14. FIG. 15 is a flowchart for explaining a sequence of operations performed during the detection operation (Step S67) illustrated in FIG. 14.

As illustrated in FIG. 15, firstly, the detecting unit 124 extracts, as the observation series O, the byte string of the examination-target unknown document file 300 that has been input (Step S71). Then, with $\theta_{Ben}$ representing the model parameter of the probability model of benign document files, the detecting unit 124 calculates the probability $P(O|\theta_{Ben})$, that is, calculates the likelihood $L_{Ben}$ according to Equation (2) (Step S72). Moreover, with $\theta_{Mal}$ representing the model parameter of the probability model of malicious document files including an ROP chain, the detecting unit 124 calculates the probability $P(O|\theta_{Mal})$ (Step S73). These probabilities can be calculated according to a forward algorithm.

Then, the detecting unit 124 extracts all byte strings that can be interpreted as ROP addresses from the observation series O (Step S74). Subsequently, assuming that each extracted byte string is searched using the offset dictionary and that each byte string represents an ROP address, the detecting unit 124 calculates the ROP addresses representing the link destinations from the ROP addresses extracted using the offset dictionary (Step S75). The detecting unit 124 treats the position of the link source ROP (address 1) as i and treats the position of the link destination ROP (address 1) as j, and treats a set $J_x$ of that combination as $J_x \ni (i, j)$ (Step S76).

Subsequently, the detecting unit 124 calculates the likelihood $L_{Mal}$ according to Equations (4) to (6) from $P(O|\theta_{Mal})$, $\theta_{Mal}$, $J_x \ni (i, j)$, and O calculated earlier (Step S77). Then, from the likelihoods $L_{Ben}$ and $L_{Mal}$, the detecting unit 124 calculates the likelihood ratio Z using Equation (7) (Step S78). Subsequently, the detecting unit 124 determines whether or not the likelihood ratio Z is greater than the predetermined threshold value t (Step S79).

If it is determined that the likelihood ratio Z is greater than the predetermined threshold value t (Yes at Step S79), then the detecting unit 124 detects that the examination-target unknown document file 300 is a malicious document file including an ROP chain (Step S80).

On the other hand, if it is determined that the likelihood ratio Z is equal to or smaller than the predetermined threshold value t (No at Step S79), then the detecting unit 124 detects that the examination-target unknown document file 300 does not include an ROP chain (Step S81). Then, the detecting unit 124 outputs the detection result with respect to the examination-target unknown document file 300 (Step S82), and ends the detection operation.

Effect of Embodiment

As described above, in the attack code detection apparatus 10 according to the present embodiment, a probability model in which the features of a malicious document file including an ROP chain are learnt and a probability model in which the features of a benign document file are learnt are generated in advance. Moreover, in the attack code detection apparatus 10, the library files used in the ROP gadgets are analyzed in advance, and an offset dictionary is generated in which the ROP addresses and the offsets of the stack pointers are stored in a corresponding manner. Then, in the attack code detection apparatus 10, based on the generated probability models and the offset dictionary, the likelihood indicating the malicious-document-file-likeness and the likelihood indicating the benign-document-file-likeness is calculated with respect to the examination-target unknown document file 300. At the time of likelihood calculation, in the attack code detection apparatus 10, whether the ROP gadgets are correctly linked at the time of execution of the ROP chain is taken into account. Subsequently, in the attack code detection apparatus 10, as a result of performing a likelihood ratio test, malicious document files including an ROP chain are detected.

As a result, in the attack code detection apparatus 10 according to the present embodiment, since examination can be performed in a static manner without opening unknown documents in the viewer application, the maliciousness determination of document files can be performed at a fast rate.

Moreover, in the attack code detection apparatus 10, in accordance with the actual environment, addresses and constants are divided and, at the units of the divided bytes, the output probability of the byte string (the observation series) is obtained as the model parameter; and, in accordance with the actual environment, by taking into account the number of latent variables (labels) and the transition state of the latent variables, the transition probability of the transition series and the initial state probability of the latent series are generated as model parameters. Hence, according to the present embodiment, while adapting the actual environment, since detection can be performed using the model parameters including the transition state of the ROP chain, it becomes possible to achieve high accuracy in the detection of the ROP chain.

Furthermore, in the present embodiment, the point of view about whether or not the ROP chain is valid in which ROP gadgets are correctly linked based on the offset dictionary is incorporated in the probability calculation. Hence, in the attack code detection apparatus 10, even with respect to a byte string that is incidentally generated in a benign document file and that has a high degree of ROP-chain-likeness, examination can be performed without causing over-detection. That enables highly accurate detection of the ROP chain with reduced over-detection.

In this way, according to the attack code detection apparatus 10 according to the present embodiment, the features of a malicious document file including an ROP chain can be captured according to a static approach not accompanying execution of application programs, thereby enabling highly accurate detection at a fast rate. Moreover, in the attack code detection apparatus 10, as a result of verifying the validness of the ROP chain based on the analysis of the library file performed in advance, over-detection can be reduced with fewer overheads and without losing on the speed, and a highly accurate ROP chain detection can be performed.

As described above, the present embodiment proves useful in the detection of malicious document files including an ROP chain, and is suitable in performing examination of a number of document files without losing on the speed. For that reason, if the attack code detection apparatus 10, the attack code detection method, and the attack code detection method according to the present embodiment are implemented in a network monitoring apparatus and a network, it becomes possible to examine whether or not a large number of document files passing through the network are malicious document files including an ROP chain.

Meanwhile, in the present embodiment, the explanation is given for an example in which, on the basis of the RCI verification, the detecting unit 124 uses probability models and detects whether or not the examination-target unknown document file 300 is a malicious document file. However, that is not the only possible case. Alternatively, for example, even in the case of implementing a deterministic method disclosed in Non Patent Literature 2, the detection can be performed by implementing the RCI verification. More particularly, the detecting unit 124 stores, as a feature string, the known addresses used by the attacker. Then, in the data string of a certain length in the examination-target unknown document file 300, if a plurality of stored feature strings is included and if the RCI is not collapsed for the feature strings, then the detecting unit 124 detects that the examination-target unknown document file 300 is a malicious document file.

Moreover, in the present embodiment, the explanation is given on the premise of the ROP chain embedded in document files. However, even in the case of data other than document files, if there is some trend in the distribution of the byte string, the detection can be performed in an identical manner. Thus, in the present embodiment, for example, detection of the communication data including ROP chains is also possible. More particularly, the present embodiment can be implemented for any types of files such as image files, video files, and execution files.

Other Embodiments

[Learning Method]

In the present embodiment, although probability models are used in serial learning, it is not always necessary to use probability models. As the premise, the problem of static detection of ROP chains is treated as the problem of structural learning for learning serial data; and, in the present embodiment, an RCI-based constraint is applied to the static detection of ROP chains. Hence, the problem can be treated as constrained structural learning. It is known that such constrained structural learning can be solved not only according to the high-speed approximate computation method using the probability models according to the present embodiment, but also according to a learning model such as structure perceptron (for details, refer to Ming-Wei Chang, Lev Ratinov and Dan Roth, "Structured learning with constrained conditional models", Machine learning 88.3 (2012): 399-431.) other than the probability model. Hence, it is not always necessary to use the probability model.

[System Configuration]

The constituent elements of the apparatus illustrated in the drawings are merely conceptual, and need not be physically configured as illustrated. The constituent elements, as a whole or in part, can be separated or integrated either functionally or physically based on various types of loads or use conditions. Moreover, the process functions performed by the apparatus are entirely or partially realized by the CPU or computer programs that are analyzed and executed by the CPU, or realized as hardware by wired logic.

Of the processes described in the embodiment, all or part of the processes explained as being performed automatically can be performed manually. Similarly, all or part of the processes explained as being performed manually can be performed automatically by a known method. The processing procedures, the control procedures, specific names, various data, and information including parameters described in the embodiment or illustrated in the drawings can be changed as required unless otherwise specified.

[Program]

Figure 16:
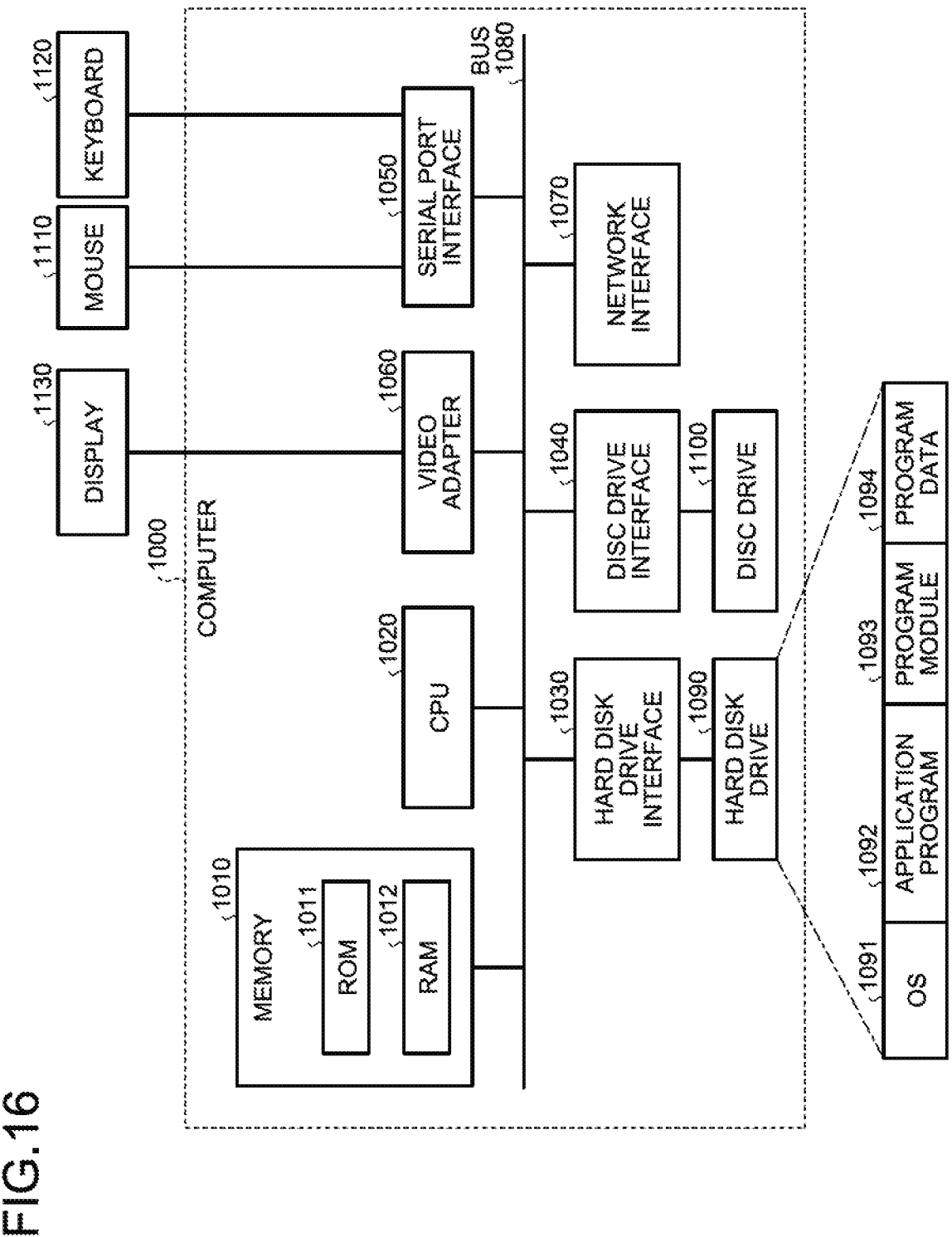
FIG. 16 is a diagram illustrating an example of a computer in which the attack code detection apparatus is implemented as a result of executing a program.

FIG. 16 is a diagram illustrating an example of a computer in which the attack code detection apparatus 10 is implemented as a result of executing a program. For example, a computer 1000 includes a memory 1010 and a CPU 1020. Moreover, the computer 1000 includes a hard disk drive interface 1030, a disc drive interface 1040, a serial port interface 1050, a video adapter 1060, and a network interface 1070. These constituent elements are connected to each other by a bus 1080.

The memory 1010 includes a ROM (Read Only Memory) 1011 and a RAM 1012. The ROM 1011 is used to store, for example, a boot program such as BIOS (Basis Input Output System). The hard disk drive interface 1030 is connected to a hard disk drive 1090. The disc drive interface 1040 is connected to a disc drive 1100. For example, a detachably-attachable memory medium such as a magnetic disk or an optical disc is inserted in the disc drive 1100. The serial port interface 1050 is connected to, for example, a mouse 1110 and a keyboard 1120. The video adapter 1060 is connected to, for example, a display 1130.

The hard disk drive 1090 is used to store, for example, an OS 1091, an application program 1092, a program module 1093, and program data 1094. That is, a program that defines the operations of the attack code detection apparatus 10 is implemented as the program module 1093 in which the code executable by the computer 1000 is written. The program module 1093 is stored in, for example, the hard disk drive 1090. For example, the program module 1093 that is meant for executing operations identical to the functional configuration of the attack code detection apparatus 10 is stored in the hard disk drive 1090. Meanwhile, the hard disk drive 1090 can be substituted with an SSD (Solid State Drive).

The setting data that is used in the operations according to the embodiment is stored as the program data 1094 in, for example, the memory 1010 or the hard disk drive 1090. As may be necessary, the CPU 1020 reads the program module 1093 and the program data 1094 from the memory 1010 or the hard disk drive 1090 into the RAM 1012, and executes it.

The program module 1093 and the program data 1094 is not limited to be stored in the hard disk drive 1090. Alternatively, for example, the program module 1093 and the program data 1094 can be stored in a detachably-attachable memory medium, and the CPU 1020 can read the program module 1093 and the program data 1094 via the disc drive 1100. Still alternatively, the program module 1093 and the program data 1094 can be stored in some other computer that is connected via a network (such as a LAN or a WAN). Then, the CPU 1020 can read the program module 1093 and the program data 1094 from the other computer via the network interface 1070.

Herein, although the description is given about the embodiment of the invention made by the inventor(s), the technical scope of the present invention is not limited to the embodiment described above, and can be construed as embodying various deletions, alternative constructions, and modifications that may occur to one skilled in the art that fairly fall within the basic teaching herein set forth.

REFERENCE SIGNS LIST 10 attack code detection apparatus
11 preprocessing unit
12 control unit
13 output unit
14 memory unit
20 offset dictionary database (DB)
30 probability model DB
100 labeled malicious document file
121 file format determining unit
122 decoding unit
123 learning unit
124 detecting unit
200 labeled benign document file
300 examination-target unknown document file
400 learning data library file

The invention claimed is:

1. An attack code detection apparatus comprising:
a memory; and
a processor coupled to the memory and programmed to execute a process comprising:
using, as learning data, a known malicious data series including a Return Oriented Programming (ROP) chain and a known benign data series;
generating a probability model in which features of byte strings of malicious data strings are learnt and generating a probability model in which features of byte strings of benign data series are learned;
preprocessing that
analyzes in advance a library file for learning used in the ROP chain, and
obtains as an offset dictionary a set including an address of an ROP gadget, which represents a piece of code in the library file, and an increment value of stack pointer at time of execution of the ROP gadget; and
detecting that
uses the probability model of the learning and the offset dictionary of the preprocessing,
verifies, regarding an unknown data series representing an examination target, whether or not the ROP chain is valid in which ROP gadgets are correctly linked, and
determines that the unknown data series representing the examination target is a malicious data series, when a likelihood ratio of a likelihood that the unknown data series includes the ROP chain by a likelihood that the unknown data series does not include the ROP chain is equal to or greater than a predetermined threshold,
wherein the likelihood that the unknown data series includes the ROP chain is determined by multiplying a probability, based on the probability model in which features of byte strings of malicious data strings are learnt, that the unknown data series includes the ROP chain, by a probability determined based on the offset dictionary that the unknown data series does not cause an ROP chain violation, and wherein the likelihood that the unknown data series does not include the ROP chain is based on the probability model in which features of byte strings of benign data strings are learnt.

2. The attack code detection apparatus according to claim 1, wherein the detecting takes into account possibility of correct linking among the ROP gadgets, performs a likelihood ratio test between a model of the malicious data series and a model of the benign data series, and detects whether or not the unknown data series representing the examination target is the malicious data series.

3. The attack code detection apparatus according to any one of claim 1, wherein the malicious data series and the benign data series are document files.

4. An attack code detection method implemented in an attack code detection apparatus, comprising:
a preprocessing that includes
using, as learning data, a known malicious data series including a Return Oriented Programming (ROP) chain and a known benign data series,
generating a probability model in which features of byte strings of malicious data strings are learnt and generating a probability model in which features of byte strings of benign data series are learned,
analyzing in advance a library file for learning used in the ROP chain, and
obtaining as an offset dictionary a set including an address of an ROP gadget, which represents a piece of code in the library file, and an increment value of stack pointer at time of execution of the ROP gadget; and
a detecting that includes
using, based on the probability model of the learning and the offset dictionary of the preprocessing,
verifying, regarding an unknown data series representing examination target, whether or not the ROP chain is valid in which ROP gadgets are correctly linked, and
determining that the unknown data series representing the examination target is a malicious data series, when a likelihood ratio of a likelihood that the unknown data series includes the ROP chain by a likelihood that the unknown data series does not include the ROP chain is equal to or greater than a predetermined threshold,
wherein the likelihood that the unknown data series includes the ROP chain is determined by multiplying a probability, based on the probability model in which features of byte strings of malicious data strings are learnt, that the unknown data series includes the ROP chain, by a probability determined based on the offset dictionary that the unknown data series does not cause an ROP chain violation, and wherein the likelihood that the unknown data series does not include the ROP chain is based on the probability model in which features of byte strings of benign data strings are learnt.

5. A non-transitory computer-readable recording medium having stored therein an attack code detection program that causes a computer to execute a process comprising:
a preprocessing that includes
using, as learning data, a known malicious data series including a Return Oriented Programming (ROP) chain and a known benign data series,
generating a probability model in which features of byte strings of malicious data strings are learnt and generating a probability model in which features of byte strings of benign data series are learned,
analyzing in advance a library file for learning used in the ROP chain, and
obtaining as an offset dictionary a set including an address of an ROP gadget, which represents a piece of code in the library file, and an increment value of stack pointer at time of execution of the ROP gadget; and a detecting that includes
- using, based on the probability model of the learning and the offset dictionary of the preprocessing,
- verifying, regarding an unknown data series representing examination target, whether or not the ROP chain is valid in which ROP gadgets are correctly linked, and
- determining that the unknown data series representing the examination target is a malicious data series, when a likelihood ratio of a likelihood that the unknown data series includes the ROP chain by a likelihood that the unknown data series does not include the ROP chain is equal to or greater than a predetermined threshold, wherein the likelihood that the unknown data series includes the ROP chain is determined by multiplying a probability, based on the probability model in which features of byte strings of malicious data strings are learnt, that the unknown data series includes the ROP chain, by a probability determined based on the offset dictionary that the unknown data series does not cause an ROP chain violation, and wherein the likelihood that the unknown data series does not include the ROP chain is based on the probability model in which features of byte strings of benign data strings are learnt.

* * * * *